(12) United States Patent
Sherbeck et al.

(10) Patent No.: US 11,384,858 B2
(45) Date of Patent: Jul. 12, 2022

(54) LOCKING ASSEMBLY APPARATUS AND METHODS FOR FLUID ENDS

(71) Applicant: FORUM US, INC., Houston, TX (US)

(72) Inventors: Timothy Sherbeck, Katy, TX (US); Chinedu Ezeka, Katy, TX (US); Heinrich Bartels, Houston, TX (US)

(73) Assignee: FORUM US, INC., Houston, TX (US)

( * ) Notice: Subject to any disclaimer, the term of this patent is extended or adjusted under 35 U.S.C. 154(b) by 215 days.

(21) Appl. No.: 16/888,115

(22) Filed: May 29, 2020

(65) Prior Publication Data

US 2021/0270382 A1    Sep. 2, 2021

Related U.S. Application Data

(60) Provisional application No. 62/983,550, filed on Feb. 28, 2020.

(51) Int. Cl.
| | |
|---|---|
| *F16K 27/12* | (2006.01) |
| *F16K 41/02* | (2006.01) |
| *F16K 1/32* | (2006.01) |
| *F04B 53/22* | (2006.01) |
| *F04B 53/10* | (2006.01) |
| *F04B 53/16* | (2006.01) |
| *F16K 35/00* | (2006.01) |

(52) U.S. Cl.
CPC ............. *F16K 27/12* (2013.01); *F04B 53/10* (2013.01); *F04B 53/16* (2013.01); *F04B 53/22* (2013.01); *F16K 1/32* (2013.01); *F16K 35/00* (2013.01); *F16K 41/02* (2013.01)

(58) Field of Classification Search
CPC . F16K 27/12; F16K 1/32; F16K 41/02; F16K 35/00; F04B 53/22; F04B 53/10; F04B 53/16

USPC ..................... 137/800; 251/89, 95
See application file for complete search history.

(56) References Cited

U.S. PATENT DOCUMENTS

| | | | | |
|---|---|---|---|---|
| 8,365,754 | B2 * | 2/2013 | Riley | F04B 15/02 |
| | | | | 285/391 |
| 9,169,710 | B2 * | 10/2015 | Jahnke | E21B 33/03 |
| 9,869,148 | B2 * | 1/2018 | Jahnke | F16L 37/62 |
| 9,909,580 | B2 | 3/2018 | Jahnke | |
| 2014/0318809 | A1 * | 10/2014 | Joensen | F16L 37/62 |
| | | | | 166/242.6 |

(Continued)

FOREIGN PATENT DOCUMENTS

| | | |
|---|---|---|
| DE | 202016103412 U1 | 7/2016 |
| WO | 2016099799 A2 | 6/2016 |

OTHER PUBLICATIONS

PCT International Search Report and Written Opinion dated Mar. 18, 2021, for International Application No. PCT/US2021/015756.

*Primary Examiner* — John Bastianelli

(74) *Attorney, Agent, or Firm* — Patterson + Sheridan, LLP

(57) ABSTRACT

Aspects of the disclosure relate to locking assembly apparatus and methods for fluid ends, and associated components thereof. In one implementation, a locking assembly for fluid ends includes a first actuator and a second actuator disposed at least partially below the first actuator. The second actuator includes one or more coupling surfaces disposed in coupling engagement with one or more coupling surfaces of the first actuator. The locking assembly also includes a plurality of wedges disposed about the second actuator and movable between an unlocked position and a locked position.

16 Claims, 24 Drawing Sheets

(56) References Cited

U.S. PATENT DOCUMENTS

2015/0369689 A1* 12/2015 Kotlyar ............... F16L 55/1283
  73/49.8
2017/0089334 A1  3/2017 Jahnke
2019/0136842 A1  5/2019 Nowell et al.
2019/0345931 A1* 11/2019 Jahnke ................... F16L 55/11

* cited by examiner

LOCKING ASSEMBLY APPARATUS AND METHODS FOR FLUID ENDS

CROSS-REFERENCE TO RELATED APPLICATIONS

This application claims benefit of U.S. provisional patent application Ser. No. 62/983,550, filed Feb. 28, 2020, which is herein incorporated by reference.

BACKGROUND

Field

The disclosure relates to locking assembly apparatus and methods for fluid ends, and associated components thereof. In one aspect, the present disclosure relates to locking assembly apparatus and methods for a cover disposed in an opening of a fluid end.

Description of the Related Art

Covers may be used on fluid ends in the oil and gas industry, for example on fluid ends of frac pumps or mud pumps. Covers can back out of fluid ends, for example from high pressure operation of the fluid ends. Attempts to lock these covers carry extra parts, reduced efficiencies, increased operational times, complex design and operation, and increased costs.

Therefore, there is a need for a locking assembly that facilitates high operating pressure capabilities, sealing during operation, higher efficiencies, less parts, reduced operational times, less complex operation and design, and reduced costs.

SUMMARY

Implementations of the present disclosure relate to locking assembly apparatus and methods for fluid ends, and associated components thereof.

In one implementation, a locking assembly for fluid ends includes a first actuator, the first actuator including one or more coupling surfaces. The locking assembly also includes a second actuator disposed at least partially below the first actuator. The second actuator includes a body, the body including one or more tapered interfacing surfaces. The second actuator also includes one or more coupling surfaces disposed in coupling engagement with the one or more coupling surfaces of the first actuator, and a center axis extending in a longitudinal direction through the body, where the one or more tapered interfacing surfaces taper inward at an angle relative to the center axis. The locking assembly also includes a plurality of wedges disposed about the second actuator and movable between an unlocked position and a locked position. Each wedge of the plurality of wedges includes a set of one or more external locking surfaces, and a set of one or more tapered interfacing surfaces, where the one or more tapered interfacing surfaces of each wedge is configured to engage with one of the one or more tapered interfacing surfaces of the second actuator. The locking assembly also includes a lock ring disposed about the plurality of wedges. The lock ring includes a set of one or more internal locking surfaces configured to engage with the external locking surfaces of each wedge of the plurality of wedges.

In one implementation, a locking assembly for fluid ends includes a first actuator, the first actuator including one or more coupling surfaces, and a second actuator. The second actuator includes a body, and one or more coupling surfaces disposed in coupling engagement with the one or more coupling surfaces of the first actuator. The locking assembly also includes a plurality of wedges disposed about the second actuator and movable between an unlocked position and a locked position. Each wedge of the plurality of wedges includes a set of one or more external locking surfaces. The locking assembly also includes a guide mechanism formed between the second actuator and the plurality of wedges. The guide mechanism includes a plurality of guide blocks and a plurality of guide slots. The locking assembly also includes a lock ring disposed about the plurality of wedges, the lock ring including a set of one or more internal locking surfaces.

In one implementation, a method of locking a locking assembly to a fluid end includes turning a first actuator in a rotational direction, the first actuator including one or more coupling surfaces, and moving a second actuator upward or downward in a longitudinal direction between a lower position and an upper position. The second actuator includes one or more coupling surfaces disposed in coupling engagement with the one or more coupling surfaces of the first actuator. The method also includes moving a plurality of wedges outward from an unlocked position to a locked position, where the plurality of wedges are engaged with a lock ring disposed about the plurality of wedges in the locked position.

In one implementation, a locking assembly for fluid ends includes a first actuator, the first actuator including one or more coupling surfaces, and a second actuator disposed at least partially about the first actuator. The second actuator includes a body, the body including one or more tapered interfacing surfaces, and one or more coupling surfaces disposed in coupling engagement with the one or more coupling surfaces of the first actuator. The second actuator also includes a center axis extending in a longitudinal direction through the body, where the one or more tapered interfacing surfaces taper outward at an angle relative to the center axis. The locking assembly also includes a plurality of wedges disposed about the second actuator and movable between an unlocked position and a locked position. Each wedge of the plurality of wedges includes a set of one or more external locking surfaces, and a set of one or more tapered interfacing surfaces, where the one or more tapered interfacing surfaces of each wedge is configured to engage with one of the one or more tapered interfacing surfaces of the second actuator. The locking assembly also includes a lock ring disposed about the plurality of wedges, the lock ring including a set of one or more internal locking surfaces configured to engage with the external locking surfaces of each wedge of the plurality of wedges.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
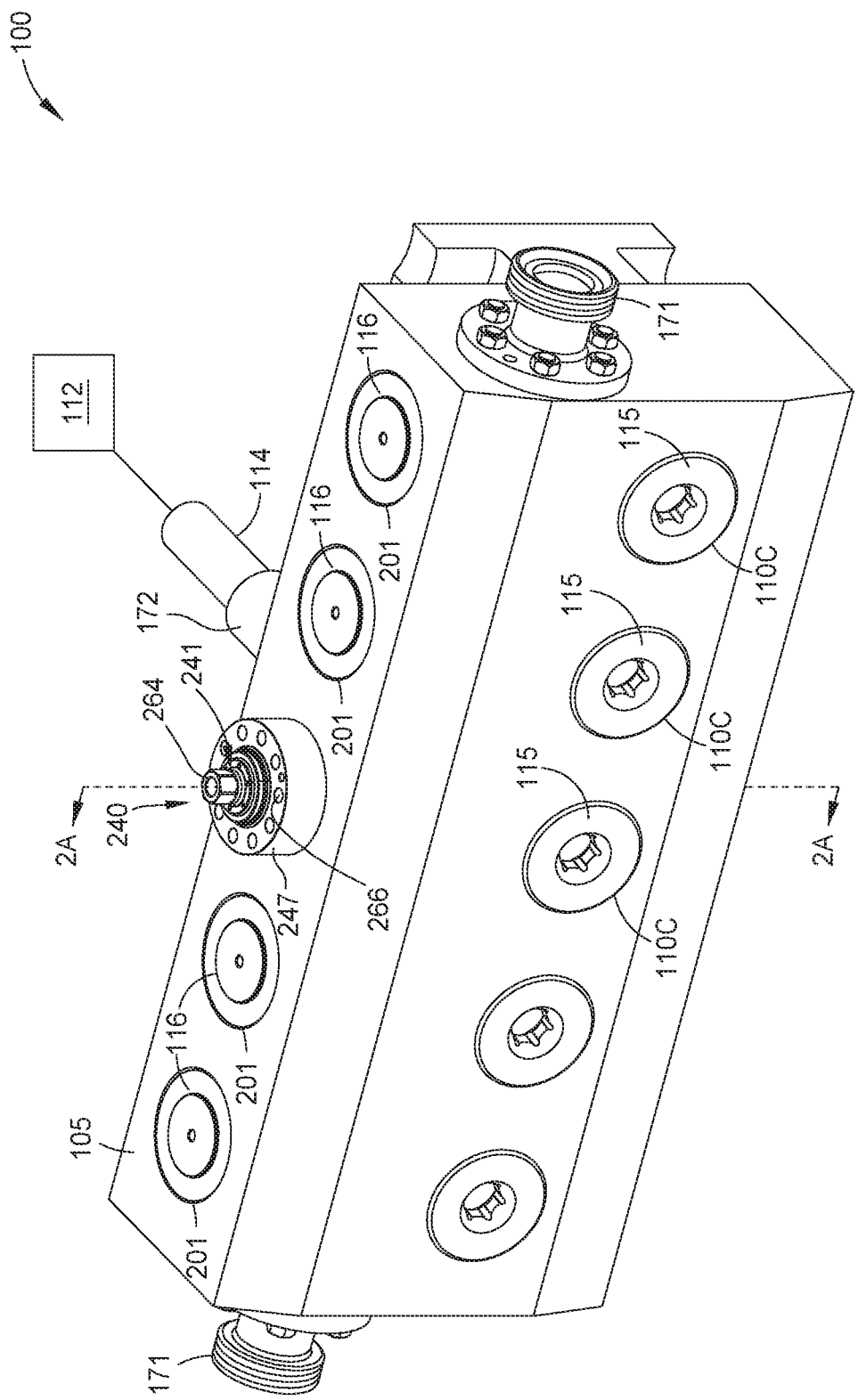
FIG. 1 is a schematic isometric partial view of a fluid end having a fluid end body and a locking assembly in a locked position, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to locking assembly apparatus and methods for fluid ends, and associated components thereof. In one aspect, the present disclosure relates to locking assembly apparatus and methods for a valve cover disposed in an opening of a fluid end.

Figure 2A:
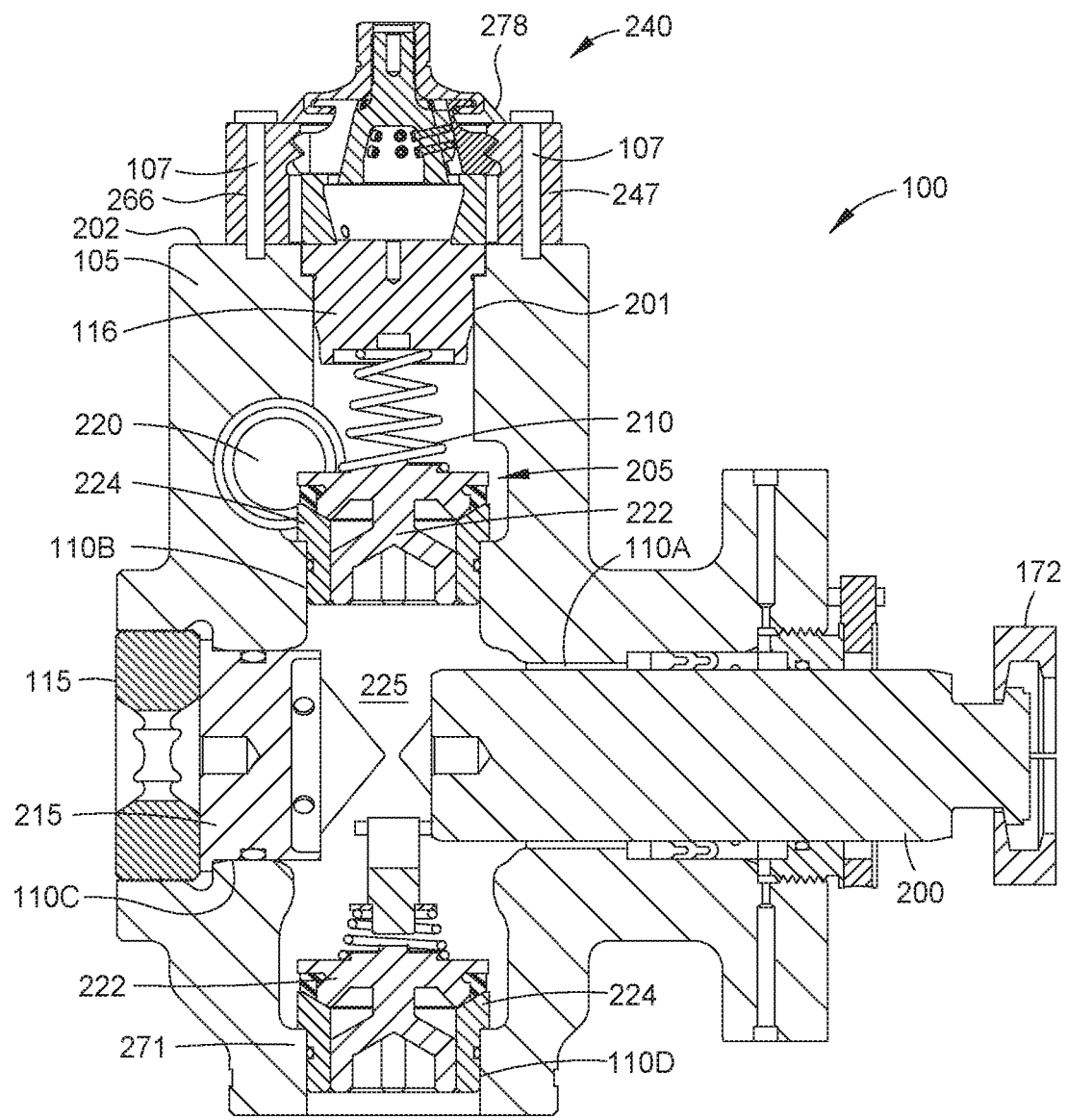
FIG. 2A is a schematic cross-sectional view of the fluid end illustrated in FIG. 1 along lines 2A-2A, according to one implementation.

FIG. 1 is a schematic isometric partial view of a fluid end 100 having a fluid end body 105 and a locking assembly 240 in a locked position, according to one implementation. The fluid end 100 includes a plurality of bores 110A-110D (bores 110A, bores 110B, and bores 110D are shown in FIG. 2A) formed in the side of the fluid end body 105. The fluid end 100 illustrated includes a plurality of retainer nuts 115 disposed in each of the bores 110C. The fluid end 100 is adapted to couple to a power end 112 via a pony rod 114. While only one pony rod 114 is shown, the power end 112 may have a pony rod that couples to each of the bores 110A (shown in FIG. 2A) of the fluid end 100. A plunger clamp 172 or any other rod connector mechanism may be disposed between the fluid end 100 and the pony rod 114. A discharge flange 171 may be coupled to opposing ends of the fluid end body 105 for connecting hoses with a discharge manifold. A locking assembly 240 is disposed above one of the valve covers 116. The present disclosure contemplates that a locking assembly 240 may be disposed above each one of the valve covers 116 (five are illustrated). Although the locking assembly 240 is described herein as being used with a frac pump, the locking assembly 240 can be used with any other types of pumps, including but not limited to mud pumps, positive displacement pumps, etc.

The fluid end 100 includes a plurality of valve covers 116. Each valve cover 116 is disposed at least partially in an opening 201 formed in the top of the fluid end body 105. The openings 201 are at least part of the bores 110B. Four valve covers 116 are shown exposed along the top of the fluid end body 105. The center valve cover 116 is secured to the fluid end body 105 by the locking assembly 240. Although the locking assembly 240 is described herein as securing valve covers 116, the locking assembly 240 may be used to secure a plug, a suction cover, a discharge cover, an access cover, a strainer cover, a retainer nut, and/or any other type of component (such as the cylindrical shaped valve cover 116 as shown in FIG. 2M) that needs to be secured to the fluid end body 105. The fluid end 100 illustrated includes a retainer nut 115 disposed in each of the bores 110B and a valve cover 116 disposed in each opening 201.

FIG. 2A is a schematic cross-sectional view of the fluid end 100 illustrated in FIG. 1 along lines 2A-2A, according to one implementation. Bores 110A, 110B, 110C, and 110D are shown FIG. 2A. A plunger 200 is shown disposed in the bore 110A, and a valve assembly 205 having a spring 210 is shown disposed in the bore 110B. A suction cover 215 is shown disposed in the bore 110C, and a suction valve assembly 271 is shown in the bore 110D. The suction cover 215 is disposed inwards of the retainer nut 115 relative to the fluid end body 105. The valve cover 116 is a discharge cover. A valve body 222 as well as a valve seat 224 may also be disposed in the bores 110B and 110D. The fluid end body 105 may also include a discharge manifold 220 formed therein that is in selective communication with at least the bore 110B. The bores 110A-110D formed in the fluid end body 105 intersect within the fluid end body 105 at a junction 225. The present disclosure contemplates that each of the suction covers 215 may be replaced with a cover similar to the valve covers 116, and/or the retainer nuts 115 may be replaced with a locking assembly similar to the locking assembly 240.

As shown in FIG. 2A, the locking assembly 240 is coupled to the fluid end body 105 by a plurality of bolts 107 that are disposed through a plurality of openings 266 formed in a lock ring 247 and threaded into the fluid end body 105. A bolt 107 is disposed through each opening 266 to fasten the lock ring 247 to the fluid end body 105 and mount the lock ring 247 to an exterior surface 202 of the fluid end body 105. The lock ring 247 is disposed about the plurality of wedges 243. In one example, the lock ring 247 is a flange. The lock ring 247 includes an outer surface 276 and an inner surface 277.

Figure 2B:
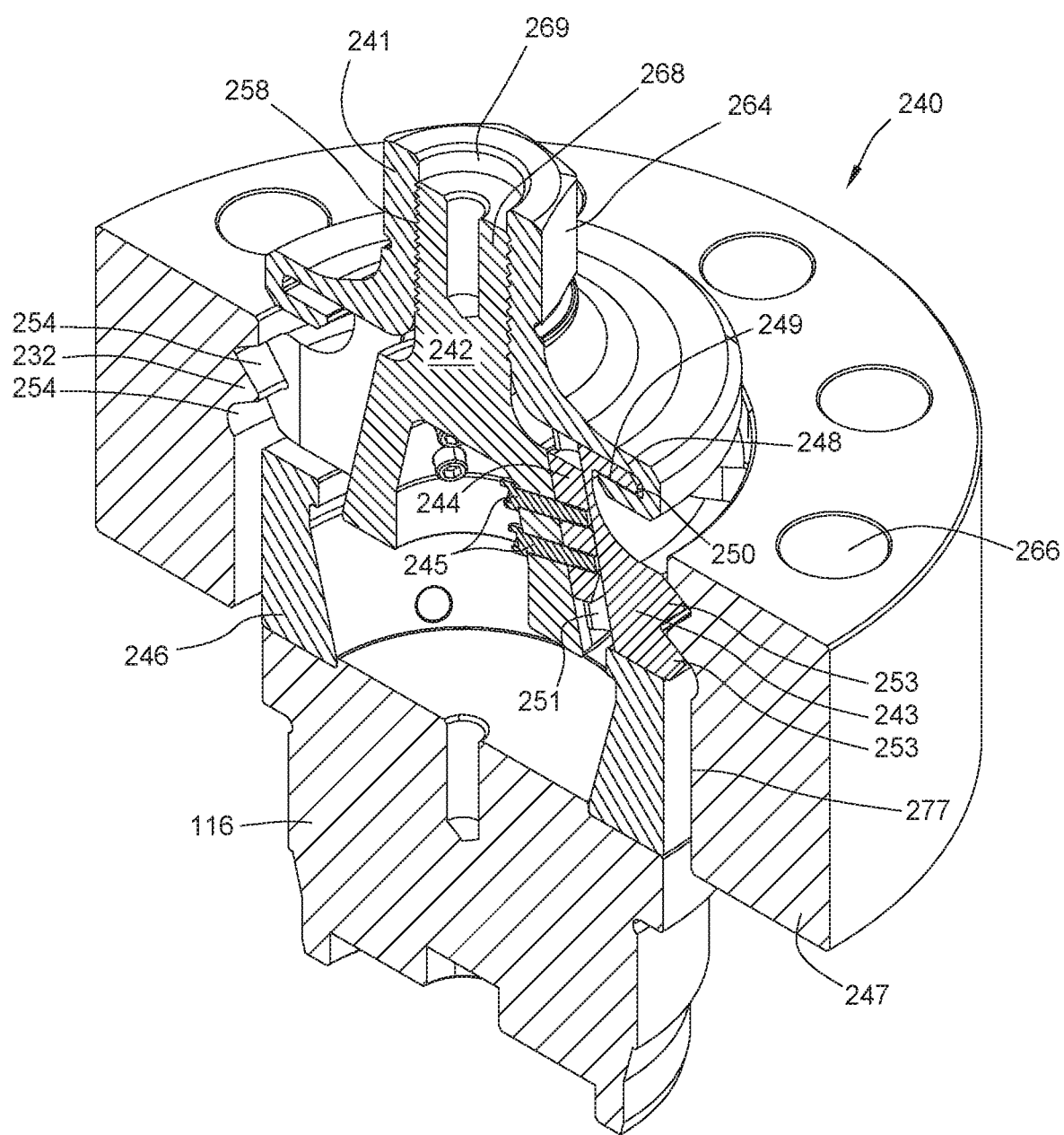
FIG. 2B is a schematic enlarged cross-sectional isometric view of the locking assembly in a locked position, according to one implementation.
Figure 2C:
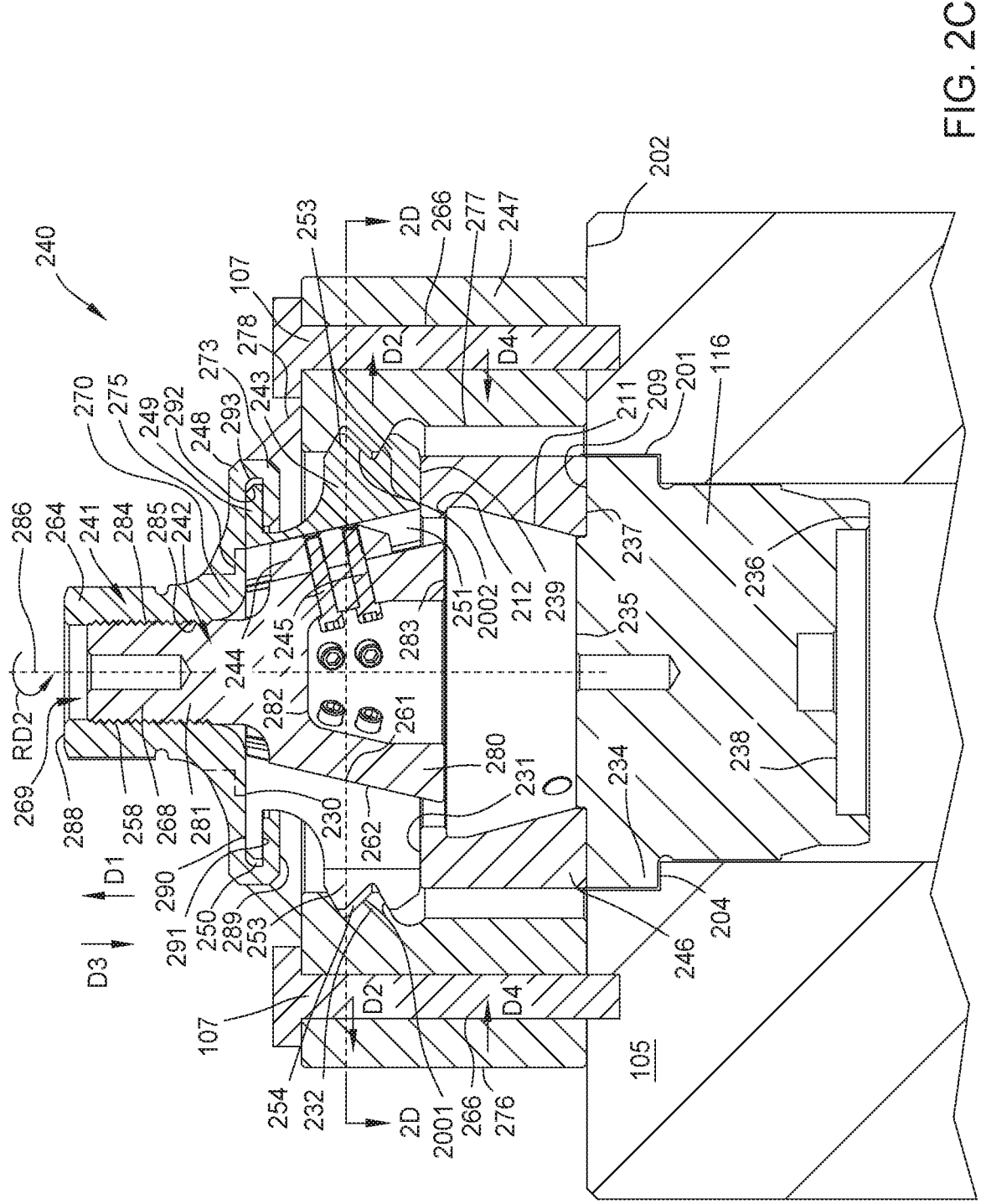
FIG. 2C is a schematic enlarged cross-sectional side view of the locking assembly in the locked position, according to one implementation.
Figure 2D:
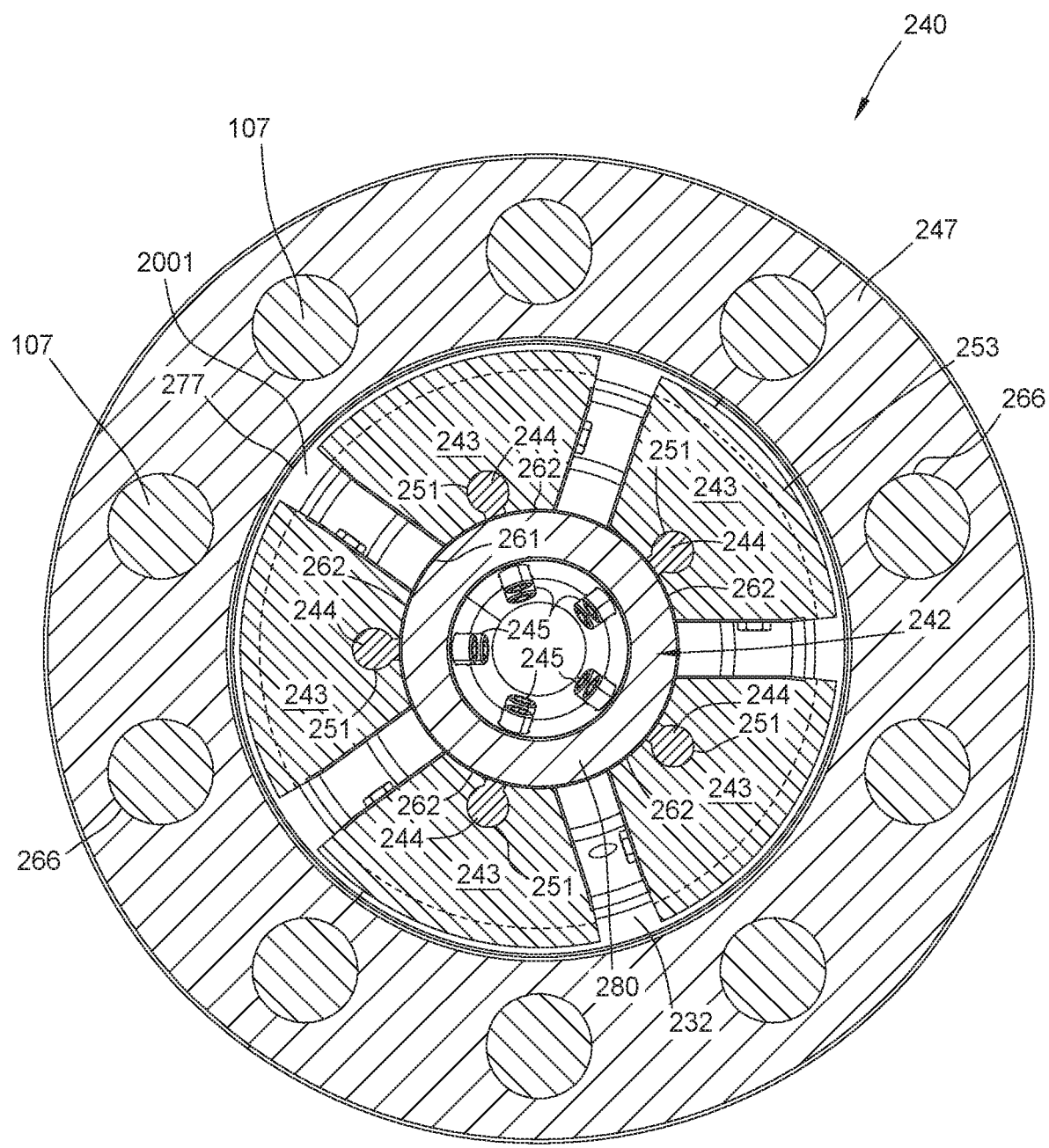
FIG. 2D is a schematic cross-sectional view of the locking assembly illustrated in FIG. 2C along lines 2D-2D, with the locking assembly in the locked position, according to one implementation.
Figure 2E:
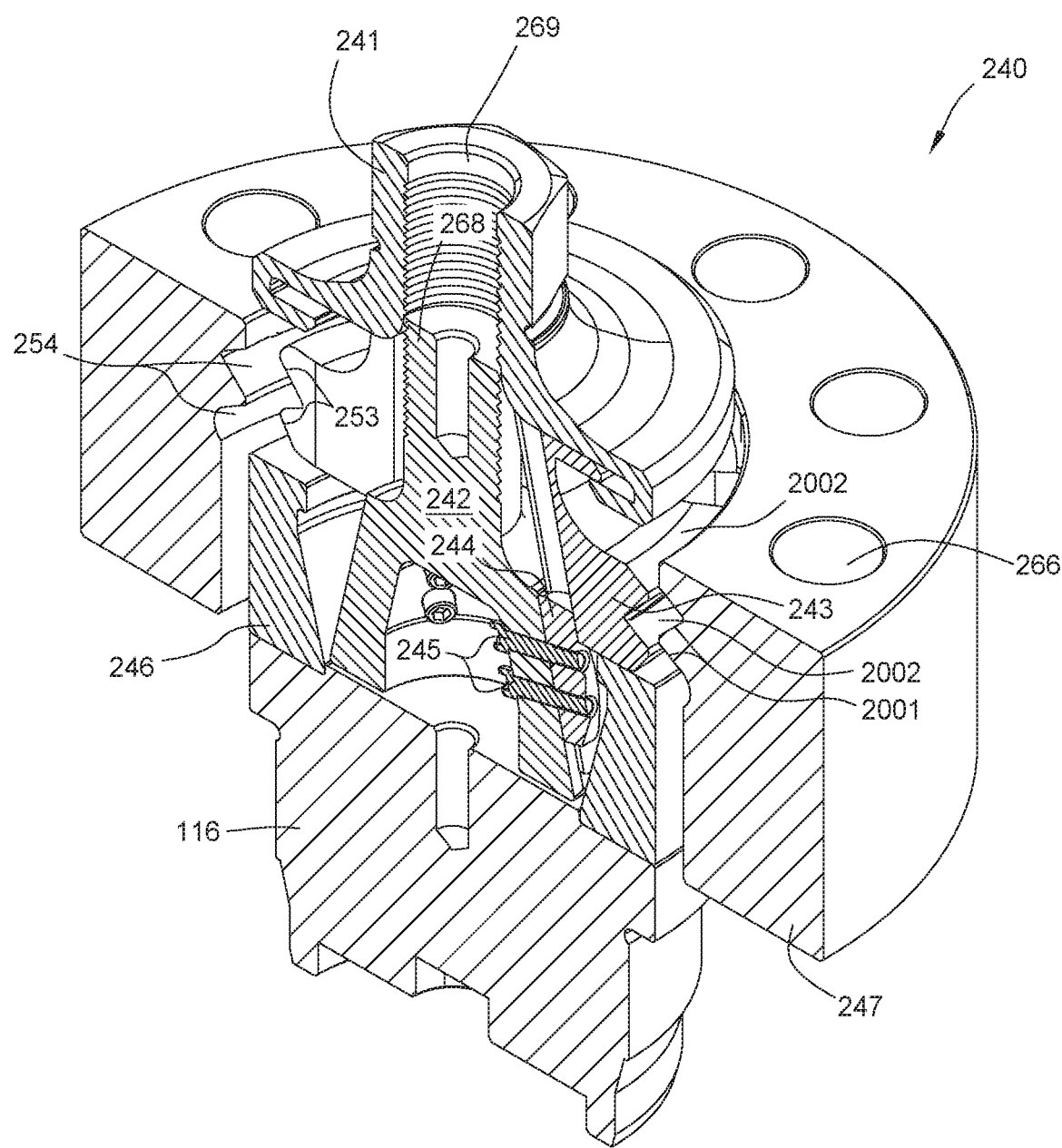
FIG. 2E is a schematic enlarged cross-sectional isometric view of the locking assembly in an unlocked position, according to one implementation.
Figure 2F:
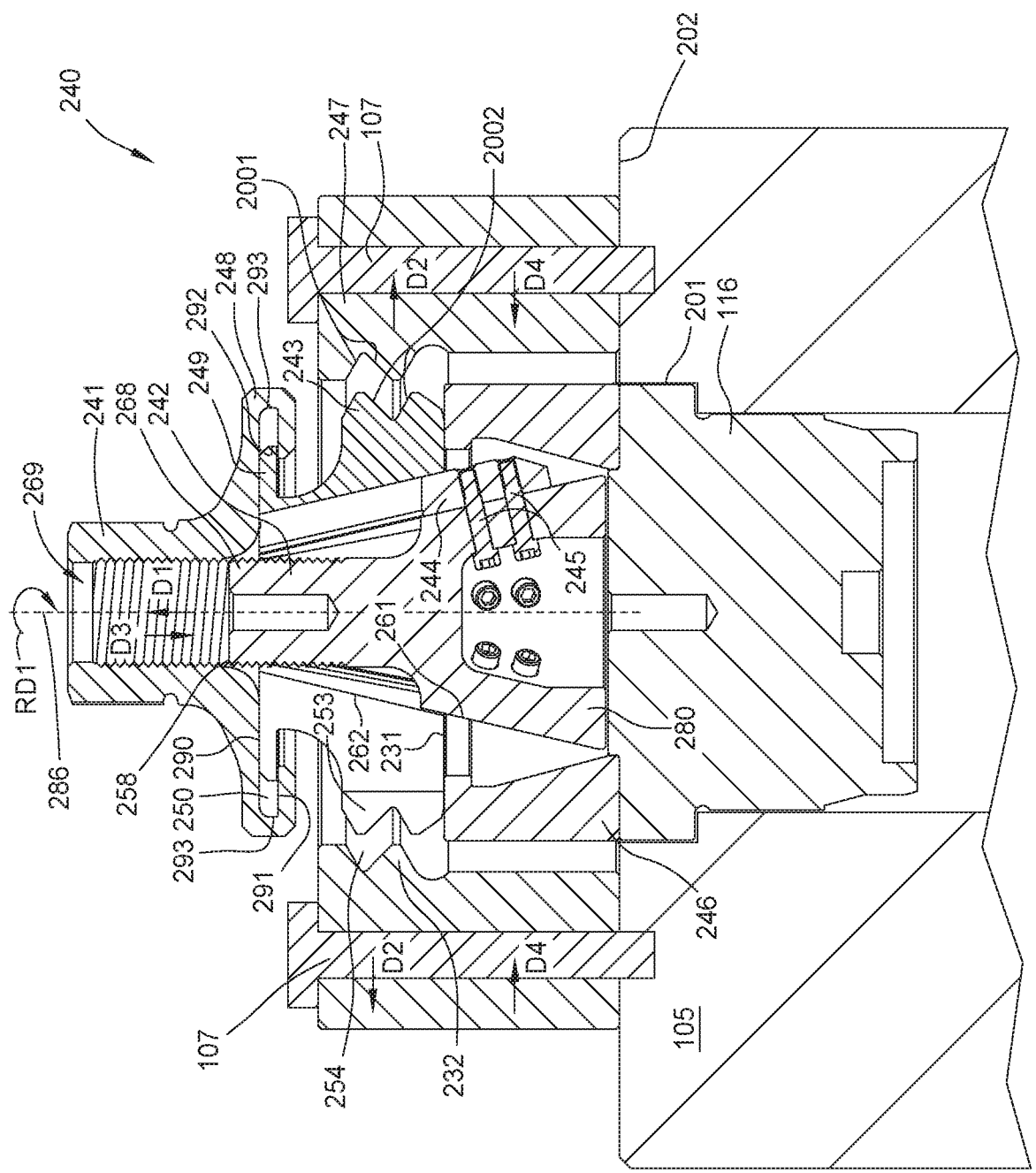
FIG. 2F is a schematic enlarged cross-sectional side view of the locking assembly in the unlocked position, according to one implementation.

FIG. 2B is a schematic enlarged cross-sectional isometric view of the locking assembly 240 in a locked position, according to one implementation. FIG. 2C is a schematic enlarged cross-sectional side view of the locking assembly 240 in the locked position, according to one implementation. Referring to FIGS. 2B and 2C, the locking assembly 240 includes a first actuator 241, a second actuator 242 at least partially disposed within a central opening 269 of the first actuator 241, and a plurality of wedges 243 that are each coupled to the first actuator 241. The second actuator 242 is disposed at least partially below the first actuator 241 in the implementations shown in FIGS. 2B and 2C. In one embodiment, which can be combined with other embodiments, the second actuator 242 is disposed at least partially above the first actuator 241. In one embodiment, which can be combined with other embodiments, the second actuator 242 is not disposed above or below the first actuator 241 but is disposed about or within the first actuator 241.

The lock ring 247 includes one or more internal locking surfaces 2001. In one embodiment, which can be combined with other embodiments, the locking surfaces 2001 are part of one or more internal teeth 232 formed in the inner surface 277. The internal locking surfaces 2001 are angled. The internal teeth 232 are formed between a plurality of internal grooves 254 formed in the inner surface 277 of the lock ring 247. The present disclosure contemplates that the lock ring 247 may be a separate component from the fluid end body 105, or that the lock ring 247 may be integrally formed with the fluid end body 105 or any of the other fluid containing bodies. The present disclosure contemplates that the lock ring 247 may be disposed adjacent the opening 201 such that the sets of internal teeth 232 and the internal grooves 254 are disposed along the opening 201 of the fluid end body 105.

The first actuator 241 is disposed at least partially above the second actuator 242. In one example, the first actuator 241 is disposed at least partially about a shaft portion 281 of the second actuator 242. The first actuator 241 includes the central opening 269 and one or more coupling surfaces 284. The one or more coupling surfaces 284 includes a threaded inner surface. The second actuator 242 includes one or more coupling surfaces 285 interfacing with and disposed in coupling engagement with the one or more coupling surfaces 284 of the first actuator 241. The one or more coupling surfaces 285 include a threaded outer surface. The one or more coupling surfaces 285 are formed on the shaft portion 281 of the second actuator 242. The second actuator 242 includes a body portion 280. In one example, the second actuator 242 includes and the shaft portion 281 that protrudes upwardly from the body portion 280 in a longitudinal direction D1, and the shaft portion 281 includes the one or more coupling surfaces 285. The present disclosure contemplates that the longitudinal direction D1 may be disposed vertically, horizontally, perpendicularly, or at an oblique angle relative to gravitational forces, or in other orientations, all depending on the orientation of the fluid end body 105. The longitudinal direction D1 extends upward and away from the fluid end body 105, and away from the fluid end opening 201.

The body portion 280 includes one or more tapered interfacing surfaces 261 and may include a recessed surface 282 formed in a lower surface 283 of the body portion 280. The second actuator 242 also includes a center axis 286 extending through the body portion 280 and the shaft portion 281. The center axis 286 extends through a center of the body portion 280 of the second actuator 242. In one embodiment, which can be combined with other embodiments, the tapered interfacing surface 261 of the body portion 280 of the second actuator 242 tapers inward relative to the center axis 286 and upward in the longitudinal direction D1. The present disclosure contemplates that use of "longitudinal" or "longitudinally" herein may be parallel to gravitational forces, or, depending on orientations of the locking assemblies, may be disposed at an oblique angle relative to the gravitational forces or disposed perpendicularly to gravitational forces.

In the implementation shown in FIG. 2C, the first actuator 241 is a single integral body. The first actuator 241 may be formed of a plurality of bodies. In one example, the first actuator 241 is formed of a first body 270 (e.g., a nut body) and a second body 273 (e.g., a retainer body) coupled to the first body 270. In one example, the first body 270 and the second body 273 interface along a ledge interface profile 275. The second body 274 may include a weather shield. In one example, the second body 273 is coupled to the first actuator 241 using one or more fasteners.

Figure 2G:
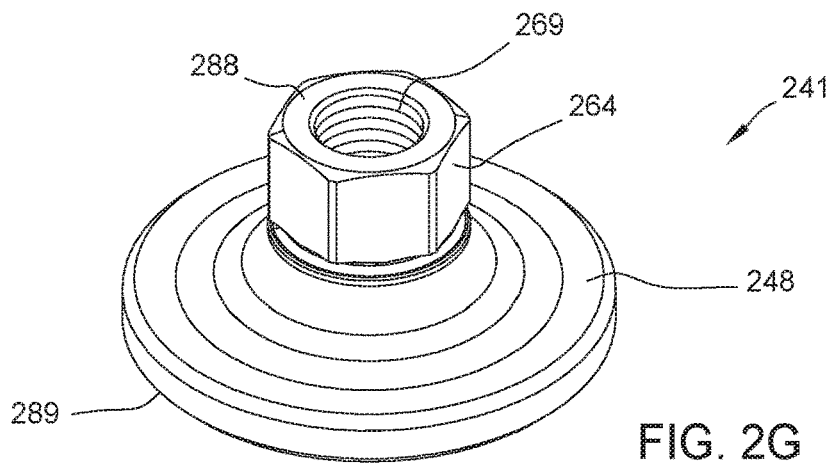
FIG. 2G is a schematic isometric partial view of a first actuator of the locking assembly, according to one implementation.

An upper portion 264 of the first actuator 241 is hexagonal in shape (as shown in FIG. 2G) but can be any other shape configured to be gripped and rotated by a tool, such as a wrench. The upper ends of the plurality of wedges 243 have a shoulder portion 249 that is inserted in an internal groove 250 formed in a base portion 248 of the first actuator 241 such that the first actuator 241 is rotatable relative to the plurality of wedges 243, and such that the wedges 243 can move laterally relative to the first actuator 241. The internal groove 250 is formed in the single integral body, in an embodiment where the first actuator 241 is a single integral body. The internal groove 250 is formed in the second body 274 in an embodiment where the first actuator 241 includes the second body 274. The shoulder portion 249 of each wedge 243 includes an outer surface 292. The first actuator 241 includes the upper portion 264 and the base portion 248 disposed below the upper portion 264. The base portion 248 is wider than the upper portion 264. The base portion 248 of the first actuator 241 includes an upper surface 288, a lower surface 289, an upper inner surface 290, a lower inner surface 291, and a recessed inner surface 293 formed at least partially by the internal groove 250.

The locking assembly also includes a flexible seal 278 coupled between the first actuator 241 and the lock ring 247. In an embodiment where the first actuator 241 includes the second body 273, the flexible seal 278 is coupled between the second body 273 and the lock ring 247. The flexible seal 278 facilitates protecting components of the locking assembly 240 from environmental conditions, such as fluid and/or debris.

The plurality of wedges 243 are coupled to the second actuator 242 by a plurality of guide blocks 244. Each guide block 244 may be formed of a single body, or a plurality of bodies coupled together. The second actuator 242 has one or more tapered interfacing surfaces 261 that interface with and engage a set of one or more tapered interfacing surfaces 262 of each of the wedges 243 such that the one or more tapered interfacing surfaces 261 slide upward and downward along the one or more tapered interfacing surfaces 261 of the wedges 243. In one embodiment, which can be combined with other embodiments, the one or more tapered interfacing surfaces 262 of each wedge 243 taper inward relative to the center axis 286 and upward in the longitudinal direction D1. In one embodiment, which can be combined with other embodiments, the one or more tapered interfacing surfaces 261 include one or more tapered outer surfaces and the one or more tapered interfacing surfaces 262 include one or more tapered inner surfaces.

Figure 2H:
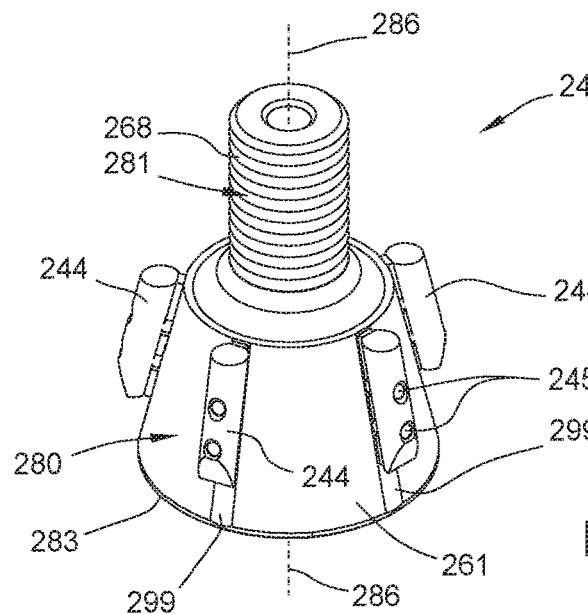
FIG. 2H is a schematic isometric partial view of a second actuator of the locking assembly, according to one implementation.

The guide blocks 244 are coupled to the second actuator 242 (as shown in FIG. 2H) by a plurality of fasteners 245, such as screws. In one embodiment, which can be combined with other embodiments, the guide blocks 244 may be integrally formed with the second actuator 242. In one example, the guide blocks 244 are integrally formed with the second actuator 242 such that each guide block 244 is a protrusion that protrudes from the tapered interfacing surface 261. Each wedge 243 includes an upper surface 230, a lower surface 231, and a guide slot 251 formed in the tapered interfacing surface 262 of the respective wedge 243. The tapered interfacing surface 262 of each wedge 243 extends from the lower surface 231 each respective wedge 243 to the upper surface 230.

Figure 2I:
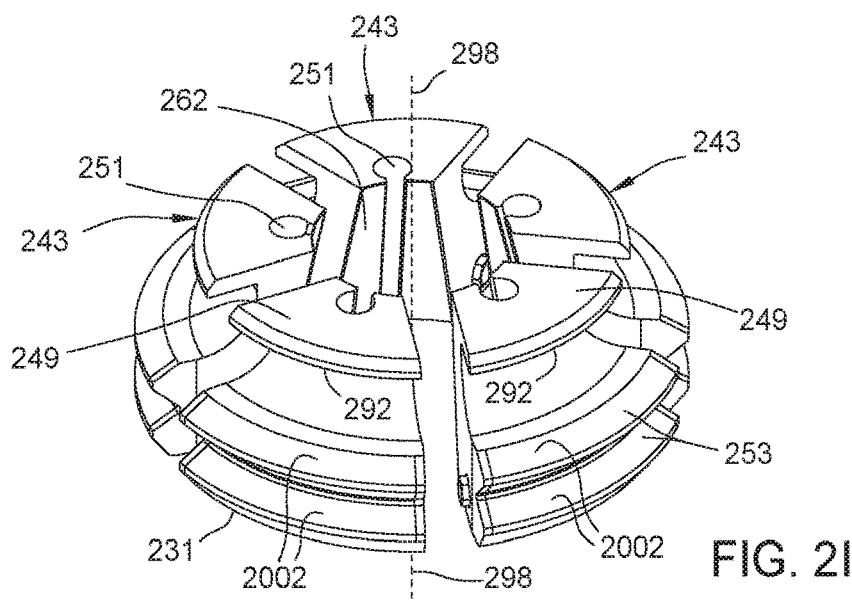
FIG. 2I is a schematic isometric partial view of wedges of the locking assembly, according to one implementation.
Figure 2J:
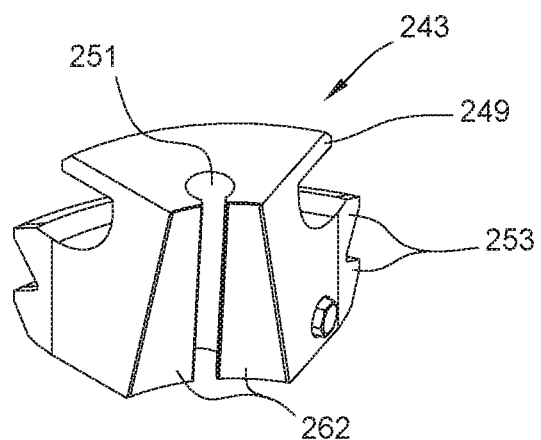
FIG. 2J is a schematic isometric partial view of one of the wedges of the locking assembly, according to one implementation.

The guide blocks 244 are located within the guide slots 251 formed within each wedge 243 (as shown in FIGS. 2I and 2J) to rotationally couple the second actuator 242 to the plurality of wedges 243 but allow axial relative movement between the second actuator 242 and the plurality of wedges 243. The guide blocks 244 and the guide slots 251 form a guide mechanism configured to keep the wedges 243 coupled to the second actuator 242. The guide mechanism can be a dovetail, circular, or other shaped interface. In one embodiment, which can be combined with other embodiments, the guide mechanism can be reversed such that the guide slots 251 are formed on the second actuator 242 and the guide blocks 244 are coupled to or integrally formed with the wedges 243.

The plurality of wedges 243 have a set of one or more external locking surfaces 2002 that engage with the one or more internal locking surfaces 2001 of the lock ring 247 and the plurality of internal grooves 254 formed on the inner surface 277 of the lock ring 247. In one embodiment, which can be combined with other embodiments, the locking surfaces 2002 are part of one or more external teeth 253 formed on the wedges 243. The locking surfaces 2002 are angled. The plurality of wedges 243 are positioned on top of an upper surface 239 of a load ring 246, which is positioned on top of the valve cover 116. In one embodiment, which be combined with other embodiments, the load ring 246 may be integrally formed with the valve cover 116 (or integrally formed with any other component, such as a plug, that is secured within the fluid end body 105). The load ring 246 includes an inner surface 211 and an upper shoulder 212 formed above the inner surface 211.

FIG. 2C illustrates the valve cover 116 disposed in the opening 201. The valve cover 116 includes a shoulder 234 that engages an inner shoulder 204 of the fluid end body 105. The valve cover 116 includes an upper surface 235 and a lower surface 236. The valve cover 116 includes a recessed surface 237 formed in the upper surface 235. The recessed surface 237 interfaces with a lower surface 209 of the load ring 246. The valve cover 116 includes a recessed surface 238 formed in the lower surface 236. The recessed surface 238 engages the spring 210 (illustrated in FIG. 2A).

FIGS. 2B and 2C illustrate the locking assembly 240 in the locked position, which secures the valve cover 116 within the fluid end body 105 during operation. FIGS. 2E and 2F illustrate the locking assembly 240 in an unlocked position when first attaching the locking assembly 240 to the fluid end body 105 or when wanting to remove and repair/replace the valve cover 116 or otherwise requiring access to the internal components of the fluid end 100.

When the locking assembly 240 is in the unlocked position, the second actuator 242 is in a lower position and the plurality of wedges 243 are in an unlocked position. In the unlocked position, the external locking surfaces 2002 are disengaged from and disposed at a gap from the internal locking surfaces 2001 of adjacent internal grooves 254 formed in the lock ring 247. When the locking assembly 240 is in the unlocked position and the wedges 243 are in the unlocked position, the first actuator 241, the second actuator 242, and the wedges 243 may be inserted into the lock ring 247 or removed from the lock ring 247 as an assembly.

The operation of attaching the locking assembly 240 to the fluid end 100 and actuating the locking assembly 240 from the unlocked position to the locked position will now be described. The locking assembly 240 is attached to the fluid end body 105 by bolting the lock ring 247 to the fluid end body 105 such that the load ring 246 is positioned on top of the valve cover 116. As stated above, the lock ring 247 may be integrally formed with the fluid end body 105 such that no bolting is required. The locking assembly 240 is in the unlocked position as shown in FIGS. 2E and 2F.

The first actuator 241 is then rotated (such as by a wrench used to grip and rotate an upper portion 264 of the first actuator 241) in a first rotational direction RD1 about the center axis 286 and relative to the second actuator 242 and the plurality of wedges 243 such that the second actuator 242 is driven upward in the longitudinal direction D1 and away from the valve cover 116 via a threaded interface 258 formed between the upper portion 264 of the first actuator 241 and an upper portion 268 of the second actuator 242. The upper portion 268 of the second actuator 242 may be a threaded shaft including the one or more coupling surfaces 285 that engage the one or more coupling surfaces 284 of the first actuator 241. The threaded outer surface of the second actuator 242 engages the threaded inner surface of the first actuator 241 to form the threaded interface 258 that moves the second actuator 242 upward or downward depending on the direction of rotation of the first actuator 241.

As the upper inner surface 290 of the first actuator 241 is engaged with the shoulder portions 249 of the wedges 243, turning the first actuator 241 to rotate the first actuator 241 moves (such as by threading) the one or more coupling surfaces 285 of the second actuator 242 upward and into the one or more coupling surfaces 284 of the first actuator 241. The threading of the second actuator 242 into the first actuator 241 moves the second actuator 242 upward in the longitudinal direction D1 from the lower position to an upper position (illustrated in FIG. 2C). The second actuator 242 moves upward in the longitudinal direction D1 relative to the valve cover 116, the fluid end body 105, the lock ring 247, the load ring 246, the wedges 243, and the first actuator 241.

As the second actuator 242 is pulled upward in the longitudinal direction D1 by the first actuator 241, the tapered interfacing surface 261 of the second actuator 242 engages the tapered interfacing surfaces 262 of the wedges 243 and forces the wedges 243 radially outward in the direction D2 and into engagement with the lock ring 247. As the second actuator 242 moves upward in the longitudinal direction D1, the tapered interfacing surface 261 slides upward along the tapered interfacing surfaces 262 of the wedges 243 and applies outward forces to the wedges 243 to push the wedges 243 outward. The guide slots 251 and the guide blocks 244 are substantially parallel with the tapered surfaces 261, 262 of the second actuator 242 and the wedges 243.

As the second actuator 242 moves upward from the lower position to the upper position, the wedges 243 move outward in directions D2 from the unlocked position to a locked position (illustrated in FIG. 2C). The wedges 243 move outward from the second actuator 242 to the lock ring 247. As the wedges 243 move outward, the lower surface 231 of each wedge 243 slides along the upper surface 239 of the load ring 246 and outward. As the wedges 243 move outward, each set of external locking surfaces 2002 moves toward one of the internal grooves 254.

In the locked position, the external locking surfaces 2002 of the wedges 243 are engaged with and received in the internal grooves 254 formed on the inner surface 277 of the lock ring 247 to help secure the load ring 246 and the valve cover 116 within the fluid end body 105. In one embodiment, which can be combined with other embodiments, the load ring 246 and the valve cover 116 form an integral component. The external locking surfaces 2002 and the internal locking surfaces 2001 may be tapered surfaces that engage with each other as the wedges 243 moved from the unlocked position to the locked position. When the wedges 243 are moved radially outward into contact with the lock ring 247, the wedges 243 move slightly downward toward the fluid end body 105 to apply a force to the load ring 246 and the valve cover 116 due to the tapered external locking surfaces 2002 engaging and moving along the tapered internal locking surfaces 2001 of the internal grooves 254. The wedges 243 may move slightly downward relative to the lock ring 247 since the lock ring 247 is bolted to (or integrally formed with) the fluid end body 105. Also, the shoulder portion 249 of each wedge 243 has enough space to move laterally (radially outward in the direction D2) within the internal groove 250 formed in the base portion 248 of the first actuator 241.

In the locked position, the internal teeth 232 of the lock ring 247 are engaged with and at least partially between the external teeth 253 of the wedges 243. In the locked position, the internal teeth 232 are interleaved between the external teeth 253 of the wedges 243. In the locked position, the outer surface 292 of the shoulder portion 249 of each wedge 243 is disposed at a first gap (shown in FIG. 2C) from the recessed inner surface 293. In the locked position, external locking surfaces of the external locking surfaces 2002 of the wedges 243 are engaged with internal locking surfaces of the internal locking surfaces 2001 of the lock ring 247.

In the locked position, the external locking surfaces 2002 engaged with the internal locking surfaces 2001, the wedges 243 engaged with the load ring 246, and the load ring 246 engaged with the valve cover 116 facilitate retaining the valve cover 116 in the opening 201 and into sealing engagement with the fluid end body 105 during operation of the fluid end 100. For example, the external locking surfaces 2002 engaged against the internal locking surfaces 2001 facilitates retaining the wedges 243 in a substantially fixed position relative to the fluid end body 105, and the engagements between the wedges 243, the load ring 246, and the valve cover 116 facilitate retaining the valve cover 116 in a substantially fixed position relative to the fluid end body 105. The wedges 243 may apply retaining surfaces directly or indirectly to the valve cover 116. The aspects also facilitate preventing the valve cover 116 from backing out of the opening 201 during high pressure operations of the fluid end 100. In the locked position, the wedges 243 and the second actuator 242 are retained within the lock ring 247. The locking assembly 240 including the wedges 243 is mounted to the fluid end body 105 in the locked position using at least the lock ring 247 mounted to the fluid end body 105. The aspects of the locking assembly 240 facilitate preventing backing out of the valve covers 116 and maintaining sealed connections of the fluid end 100 during high pressure operations of the fluid end 100.

FIG. 2D is a schematic cross-sectional view of the locking assembly 240 illustrated in FIG. 2C along lines 2D-2D, with the locking assembly 240 in the locked position, according to one implementation. The lock ring 247 includes ten openings 266 disposed circumferentially about the lock ring 247, and ten bolts 107 disposed in the openings 266. The lock ring 247 may also include an opening that is used with a handle, such as a T-shaped handle, to lift, lower, and move the locking assembly 240. The lock ring 247 may omit the openings 266, such as in an embodiment where the lock ring 247 is welded to the fluid end body 105 or an embodiment where the lock ring 247 is integrally formed with the fluid end body 105. The locking assembly 240 includes five wedges 243 disposed circumferentially about the second actuator 242. The body portion 280 includes one tapered interfacing surface 261. The guide blocks 244 (five are shown) are coupled to the body portion 280 of the second actuator 242 circumferentially about the body portion 280. Each wedge 243 includes a guide slot 251 (five are shown) formed in the tapered interfacing surface 262 of the respective wedge 243. Each guide block 244 is disposed within a respective guide slot 251.

Each guide block 244 and each guide slot 251 includes a circular portion (as illustrated in FIG. 2D) and a rectangular portion (as illustrated in FIG. 2D) disposed inward of the circular portion and toward the center axis 286. The circular portion of each guide block 244 and circular portion of each guide slot 251 includes a first width. The rectangular portion of each guide block 244 and the rectangular portion of each guide slot 251 includes a second width that is less than the first width. The second width being less than the first width facilitates the guide blocks 244 pulling inward on the wedges 243 as the second actuator 242 moves from the upper position to the lower position. The fasteners 245 are disposed through the body portion 280 and at least partially through a respective one of the guide blocks 244 to couple the guide blocks 244 to the second actuator 242. The fasteners 245 may be disposed such that head portions of the fasteners 245 are disposed within the second actuator 242 (as shown in FIGS. 2C and 2D). The fasteners 245 may be disposed such that head portions of the fasteners 245 are disposed outside of the second actuator 242 and within or outside of the guide blocks 244. The fasteners 245 may be disposed completely through the body portion 280 (as shown in FIG. 2C) or partially through the body portion 280 in openings that extend partially through the body portion 280.

As the second actuator 242 moves upward from the lower position to the upper position and the tapered interfacing surface 261 slides upward along the tapered interfacing surfaces 262, the tapered interfacing surface 261 applies outward forces to each tapered interfacing surface 262 to push each wedge 243 outward to the locked position. Additionally, each guide block 244 of the second actuator 242 applies an outward force to each wedge 243 to push the wedge 243 outward to the locked position. Each guide block 244 moves upward in the respective guide slot 251 as the second actuator 242 moves upward from the lower position to the upper position. As the second actuator 242 moves downward from the upper position to the lower position and the tapered interfacing surface 261 slides downward along the tapered interfacing surfaces 262, the guide blocks 244 apply an inward force to each wedge 243 to pull each wedge 243 inward to the unlocked position. Each guide block 244 moves downward in the respective guide slot 251 as the second actuator 242 moves downward from the upper position to the lower position.

The guide blocks 244 and the guide slots 251 are shown as circular in shape. The present disclosure contemplates that dovetail shapes, or any other shapes, may be used. In one embodiment, which can be combined with other embodiments, the guide blocks 244 and the guide slots 251 includes dovetail shapes such that the guide blocks 244 includes dovetail tails and the guide slots 251 include dovetail pins to form dovetail joints. In one embodiment, which can be combined with other embodiments, the guide blocks 244 and the guide slots 251 include dovetail shapes such that the guide blocks 244 includes dovetail pins and the guide slots 251 include dovetail tails to form dovetail joints.

In one embodiment, which can be combined with other embodiments, the guide blocks 244 are tee-shaped and the guide slots 251 are tee-shaped to form tee-shaped joints.

The joints formed by the guide blocks 244 of the second actuator 242 and the guide slots 251 of the wedges 243 facilitate the movement of the wedges 243 between the unlocked position and the locked position closely following the movement of the second actuator 242 between the upper position and the lower position as the first actuator 241 is turned. The close following facilitates reliable unlocking and locking of the locking assembly 240 to maintain the valve cover 116 in sealing engagement with the fluid end body 105 during high pressure operations. The joints also facilitate pulling the wedges 243 inward from the locked position to the unlocked position as the first actuator 241 is turned without using springs or other biasing elements to bias the wedges 243 inward. Reducing the need for biasing elements to bias the wedges 243 inward reduces cost, increases efficiencies, simplifies the design of the locking assembly, and facilitates easier manual operation of the locking assembly 240 and reduced operations times. The present disclosure, however, contemplates that springs or other biasing elements may be used in conjunction with the locking assembly 240 to facilitate operations of the locking assembly 240.

Additionally, the tapering inward and upward in the longitudinal direction D1 of the one or more tapered interfacing surfaces 261 and the tapered interfacing surfaces 262 facilitates design simplicity and locking simplicity, effective and stable locking and unlocking of the locking assembly 240, weight savings, quick and easy installation and removal of the locking assembly 240, smaller overall size of the locking assembly 240, cost savings, and enhanced operational lifespans for the locking assembly 240. Moreover, the movement of the second actuator 242 upward to the upper position to push the wedges 243 outward to the locked position also facilitates design simplicity and locking simplicity, effective and stable locking and unlocking of the locking assembly 240, weight savings, quick and easy installation and removal of the locking assembly 240, smaller overall size of the locking assembly 240, cost savings, and enhanced operational lifespans for the locking assembly 240. As an example, such aspects facilitate design simplicity and compactness as the second actuator 242 may be used without a hole that extends completely from a top end to a bottom end of the second actuator 242. As another example, the tapering inward and upward of tapered surfaces 261, 262, and the upward movement of the second actuator 242, also facilitate a simple load path between the first actuator 241 and the second actuator 242 during operation, thereby facilitating relatively low stresses and increased operational lifespans for the locking assembly 240.

Additionally, the upper surfaces 230 of the wedges 243 are planar and horizontal surfaces. The upper inner surface 290 of the first actuator 241 interfacing with upper surfaces 230 of the wedges 243 that are planar facilitates effective and stable actuation using the first actuator 241 that effectively and stably extends and retracts the wedges 243. The operation of actuating the locking assembly 240 from the locked position to the unlocked position and removing the locking assembly 240 from the fluid end 100 will now be described.

The locking assembly 240 may be moved from the locked position (illustrated in FIG. 2C) back to the unlocked position (illustrated in FIG. 2F), for example, to remove the valve cover 116 from the fluid end body 105 and/or to perform maintenance on the fluid end 100. The locking assembly 240 may be moved back to the unlocked position such that the first actuator 241, the second actuator 242, and the wedges 243 may be removed as an assembly from a central opening 296 (illustrated in FIG. 2L) of the lock ring 247. The locking assembly 240 is moved back to the unlocked position by turning the first actuator 241 in a second rotational direction RD2 that is opposite of the first rotational direction RD1 to drive the second actuator 242 downward in a longitudinal direction D3 toward the valve cover 116 using the threaded interface 258.

Turning the first actuator 241 in the second rotational direction RD2 moves (such as by threading) the one or more coupling surfaces 285 of the second actuator 242 out of the one or more coupling surfaces 284 of the first actuator 241. Threading the second actuator 242 out of the first actuator 241 moves the second actuator 242 downward in the longitudinal direction D3 that is opposite of the upward longitudinal direction D1. The second actuator 242 moves downward from the upper position back to the lower position. As the second actuator 242 moves downward, the tapered interfacing surface 261 slides downward along the tapered interfacing surfaces 262 of the wedges 243. As the second actuator 242 moves downward, the guide blocks 244 coupled to the body portion 280 of the second actuator 242 apply an inward force to each wedge 243 to pull the wedges 243 inward in inward directions D4 toward the center axis 286 and from the lock ring 247. The guide blocks 244 pull on the wedges 243 using the engagement between the guide blocks 244 and the guide slots 251 of the wedges 243. As the wedges 243 move inward, the lower surfaces 231 slide inward in the inward directions D4 toward the center axis 286. The wedges 243 are retracted and moved radially inward in the inward directions D4 and out of engagement from the lock ring 247. The entire locking assembly 240 can then be removed to provide access to the valve cover 116 and/or internal components of the fluid end 100.

The ability of the second actuator 242 to move in the longitudinal direction D1 and the opposite longitudinal direction D3, and the ability of the first actuator 241 to move in opposite first and second rotational directions RD1 and RD2, facilitate moving the locking assembly 240 to the unlocked position using the assistance of the guide blocks and the guide slots, if the locking assembly 240 becomes locked up and stuck in the locked position due to frictional forces, which may have been affected by exposure to external debris, surface corrosion buildup, or other factors detrimental to moving between the locked and unlocked positions.

Aspects of the first actuator 241 and the wedges 243, such as one or more of the internal groove 250 and/or the shoulder portions 249 of the wedges 243, facilitate guiding the wedges 243 horizontally as the wedges 243 move between the locked position and the unlocked position. The first actuator 241 may include additional guide members, such as protrusions or additional grooves that interface with protrusions or grooves of the wedges 243, to horizontally guide the wedges 243.

In the unlocked position (illustrated in FIG. 2F), the outer surface 292 of the shoulder portion 249 of each wedge 243 is disposed at a second gap from the recessed inner surface 293. The second gap is larger than the first gap (illustrated in FIG. 2C).

FIG. 2G is a schematic isometric partial view of the first actuator 241 of the locking assembly 240, according to one implementation. The first actuator 241 includes a center axis extending through a center of the first actuator 241 and through the central opening 269. The center axis is longitudinally aligned with the center axis 286 of the second actuator 242 in the locking assembly 240, as illustrated in FIGS. 2C and 2F. The upper surface 288 and the lower surface 289 of the first actuator 241 extend perpendicularly to the center axis of the first actuator 241.

FIG. 2H is a schematic isometric partial view of the second actuator 242 of the locking assembly 240, according to one implementation. Each guide block 244 coupled to the body portion 280 of the second actuator 242 may be partially disposed in or on a plurality of guide block mounting surfaces 299 formed in the one or more tapered interfacing surface 261. In one example, the guide block mounting surfaces 299 are recessed, flat, or another shape. In one example, the body portion 280 is a base portion of the second actuator 242. In one example, at least a portion of the rectangular portion of each guide block 244 is at least partially disposed in or on one of the guide block mounting surfaces 299. The one or more tapered interfacing surfaces 261 taper inward and upward toward the center axis 286 in the longitudinal direction D1. The one or more tapered interfacing surfaces 261 are neither parallel nor perpendicular to the center axis 286.

FIG. 2I is a schematic isometric partial view of the wedges 243 of the locking assembly 240, according to one implementation. The wedges 243 are disposed circumferentially about a longitudinal axis 298. The longitudinal axis 298 is longitudinally aligned with the center axis 286 of the second actuator 242 in the locking assembly 240, as illustrated in FIGS. 2C and 2F.

FIG. 2J is a schematic isometric partial view of one of the wedges 243 of the locking assembly 240, according to one implementation.

Figure 2K:
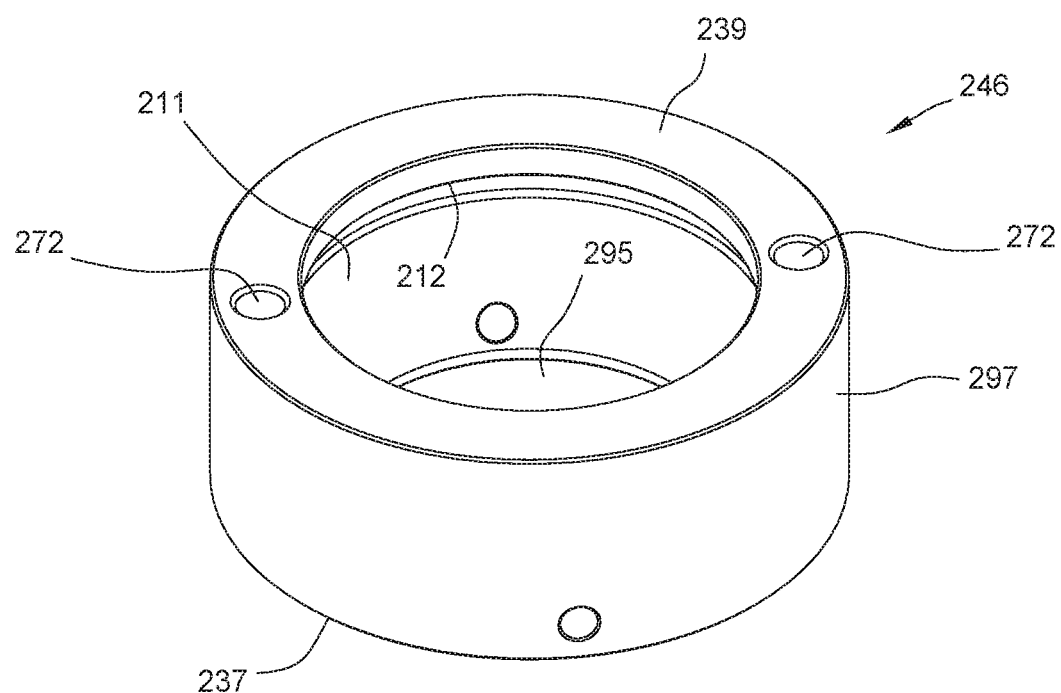
FIG. 2K is a schematic isometric view of a load ring of the locking assembly, according to one implementation.

FIG. 2K is a schematic isometric view of the load ring 246 of the locking assembly 240, according to one implementation. The load ring 246 includes a cylindrical shaped member 297 having a central opening 295. The load ring 246 may also include lifting provisions 272 which are shown as two openings formed on a top surface of the load ring 246. Other types of lifting provisions may be used to install and remove the load ring 246.

Figure 2L:
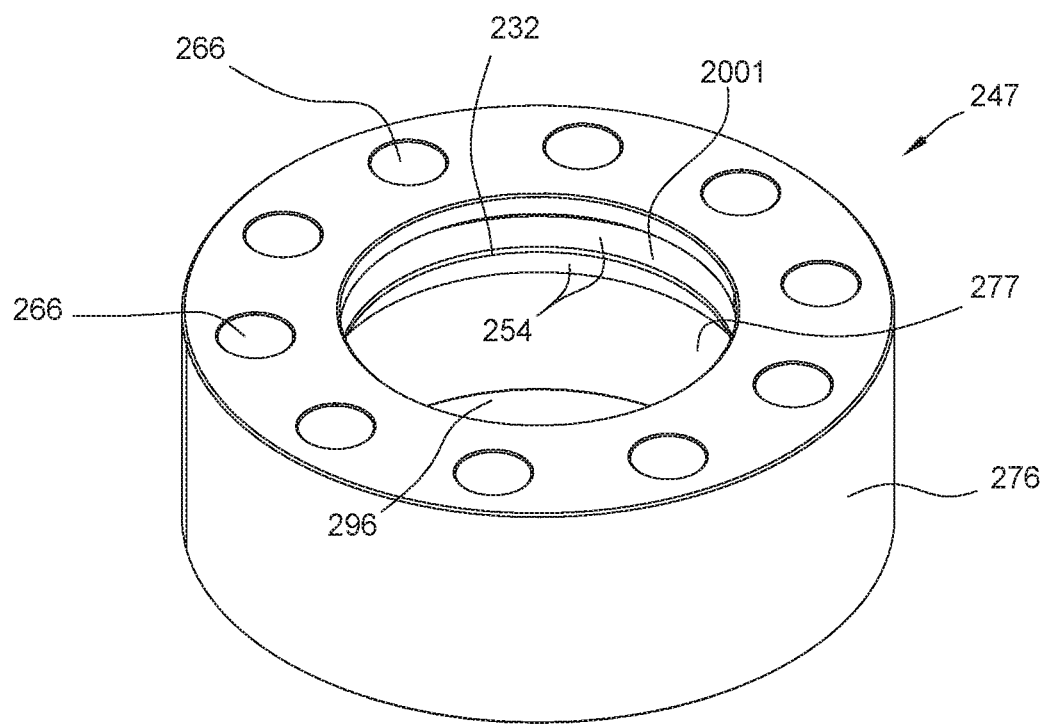
FIG. 2L is a schematic isometric partial view of a lock ring of the locking assembly, according to one implementation.
Figure 2M:
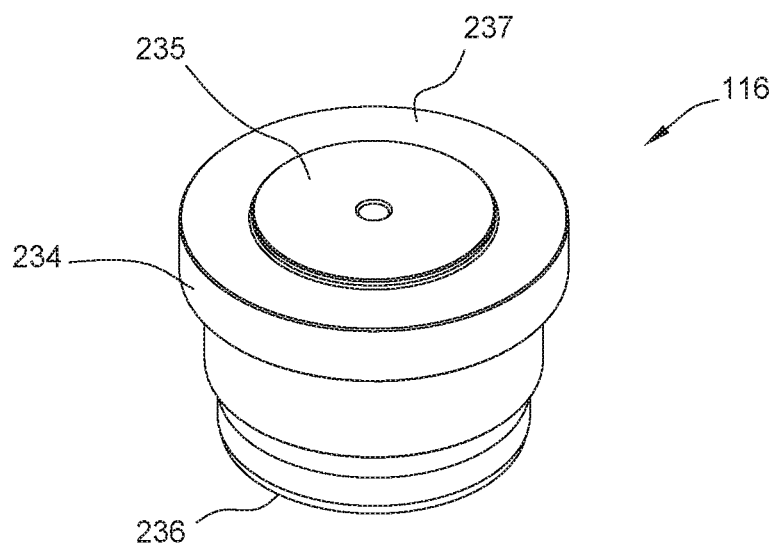
FIG. 2M is a schematic isometric partial view of a valve cover of the fluid end, according to one implementation.

FIG. 2L is a schematic isometric partial view of the lock ring 247 of the locking assembly 240, according to one implementation. The lock ring 247 includes a cylindrical member and a central opening 296 that extends from an upper surface to a lower surface of the cylindrical member. The lock ring 247 includes a center axis extending through the central opening 296 and through a center of the cylindrical member. The center axis of the lock ring 247 is longitudinally aligned with the center axis 286 of the second actuator 242 in the locking assembly 240, as illustrated in FIGS. 2C and 2F.

FIG. 2M is a schematic isometric partial view of the valve cover 116 of the fluid end 100, according to one implementation. The valve cover 116 includes a center axis extending through a center of the valve cover 116. The center axis of the valve cover 116 is longitudinally aligned with the center axis 286 of the second actuator 242 of the locking assembly 240, as illustrated in FIGS. 2C and 2F.

The present disclosure contemplates that the surfaces and slots described herein, such as the one or more tapered interfacing surfaces 261 and the tapered interfacing surfaces 262, may be planar in profile or arcuate in profile.

Figure 3:
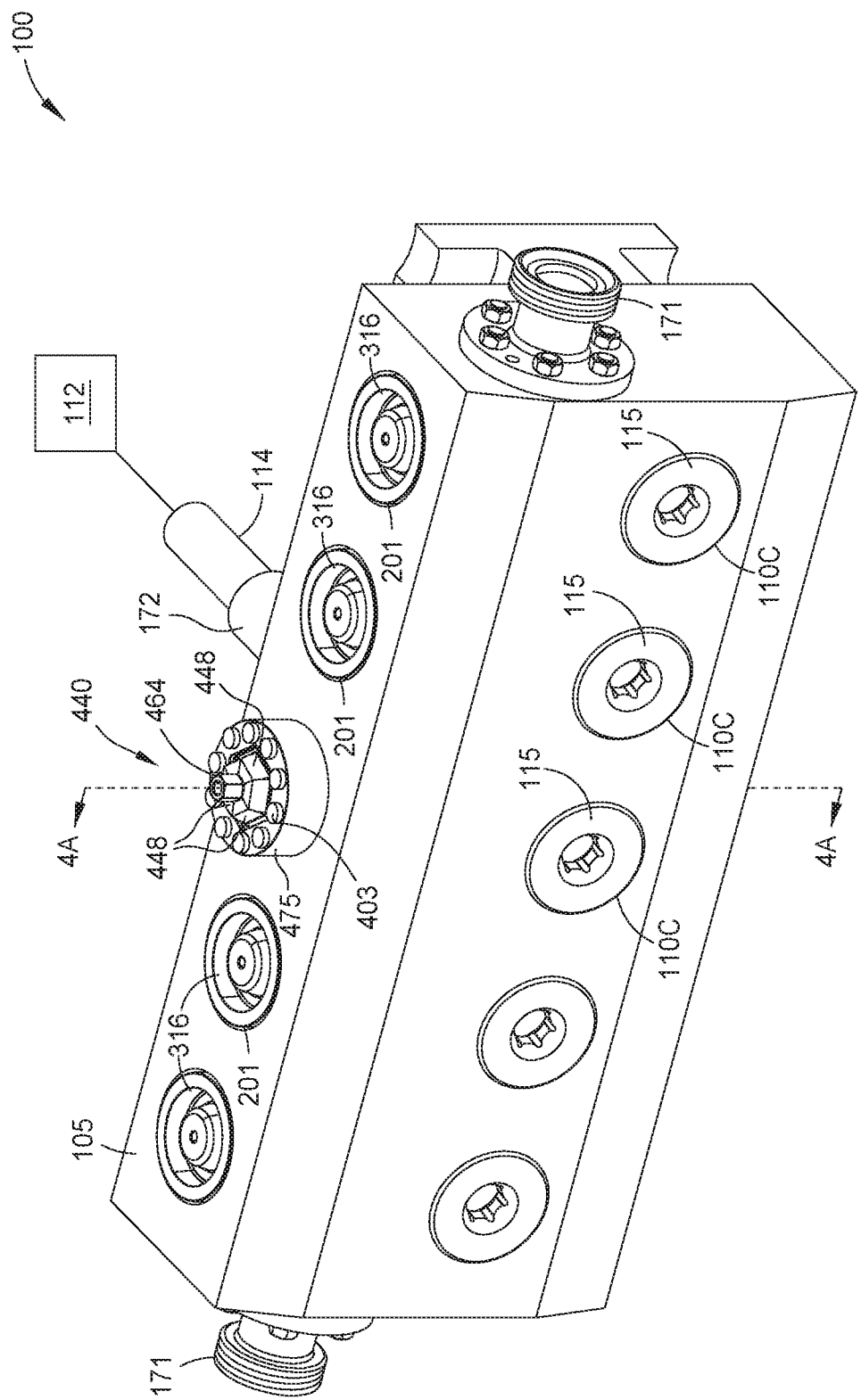
FIG. 3 is a schematic isometric partial view of a fluid end having a fluid end body and a locking assembly in an unlocked position, according to one implementation.
Figure 4A:
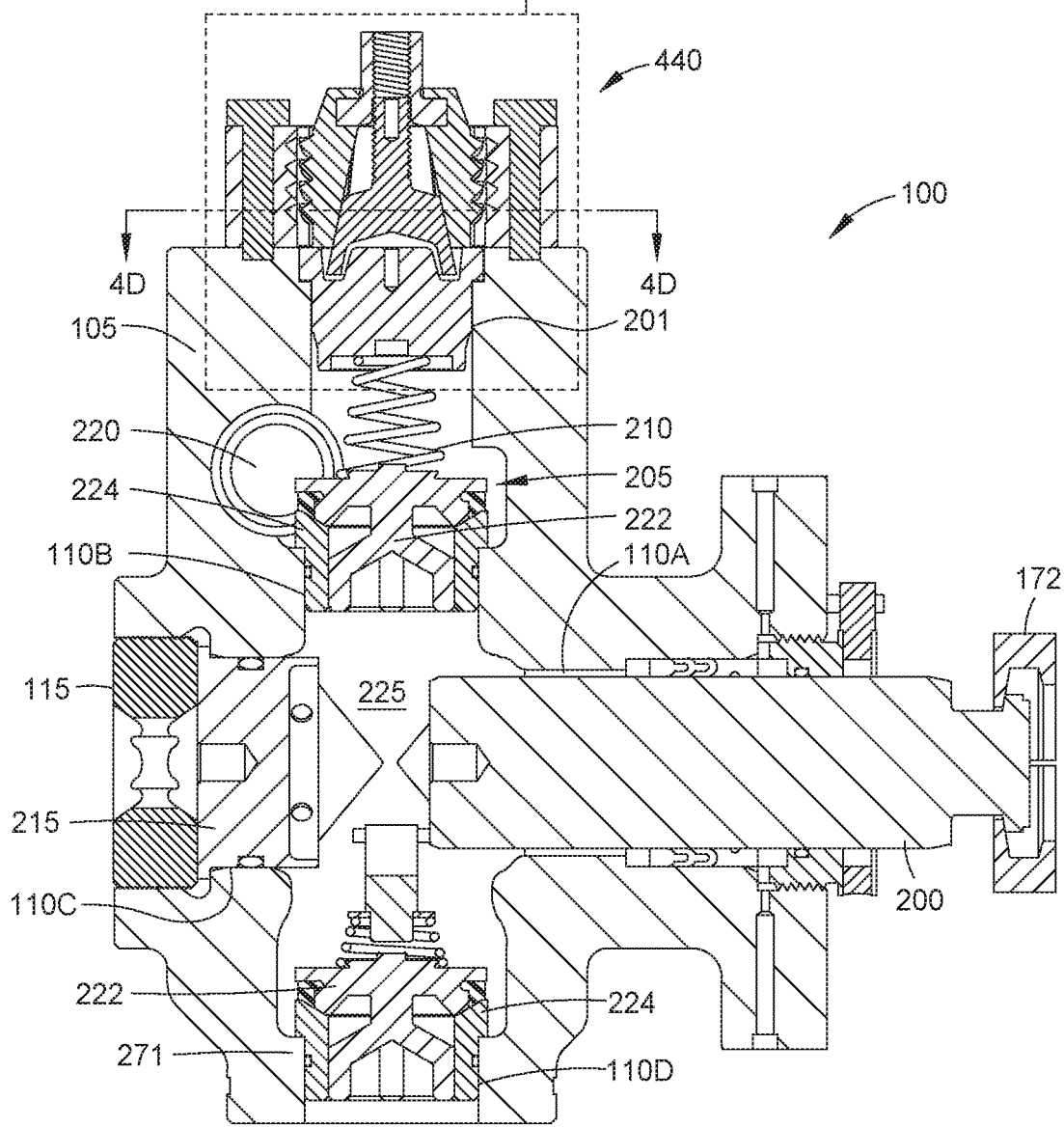
FIG. 4A is a schematic cross-sectional view of the fluid end illustrated in FIG. 3 along lines 4A-4A, according to one implementation.

FIG. 3 is a schematic isometric partial view of a fluid end 100 having a fluid end body 105 and a locking assembly 440 in an unlocked position, according to one implementation. FIG. 4A is a schematic cross-sectional view of the fluid end 100 illustrated in FIG. 3 along lines 4A-4A, according to one implementation. The fluid end 100 includes a plurality of bores 110A-110D (110A and 110D are shown FIG. 4A) formed in the fluid end body 105. The fluid end 100 is adapted to couple to a power end 112 via a pony rod 114. While only one pony rod 114 is shown, the power end 112 may have a pony rod that couples to each of the bores 110A of the fluid end 100.

The fluid end 100 includes valve covers 316. Each valve cover 316 is disposed at least partially in an opening 201 formed in the fluid end body 105. The valve covers 316 may be an opening plug, a suction cover, a discharge cover, an access cover, and/or a retainer nut. The fluid end 100 illustrated includes a retainer nut 115 disposed in each of the bores 110б and a valve cover 316 disposed in each opening 201. A locking assembly 440 is disposed above one of the valve covers 316. The present disclosure contemplates that a locking assembly 440 may be disposed above each one of the valve covers 316 (five are illustrated). A discharge flange 171 may be coupled to opposing ends of the fluid end body 105 for connecting hoses with a discharge manifold. A plunger clamp 172 may be disposed between the fluid end 100 and the pony rod 114.

Referring to FIG. 4A, the internal components of the fluid end 100 will be described. A plunger 200 is shown disposed in the bore 110A, and a valve assembly 205 having a spring 210 is shown disposed in the bore 110B. A suction cover 215 is shown disposed in the bore 110C, and a suction valve assembly 271 is shown in the bore 110D. The suction cover 215 is disposed inwards of the retainer nut 115 relative to the fluid end body 105. The valve cover 316 is a discharge cover. A valve body 222 as well as a valve seat 224 may also be disposed in the bores 110B and 110D. The fluid end body 105 may also include a discharge manifold 220 formed therein that is in selective communication with at least the bore 110B. The bores 110A-110D formed in the fluid end body 105 intersect within the fluid end body 105 at a junction 225. The present disclosure contemplates that each of the suction covers 215 may be replaced with a cover similar to the valve covers 316, and/or the retainer nuts 115 may be replaced with a locking assembly similar to the locking assembly 440.

Figure 4B:
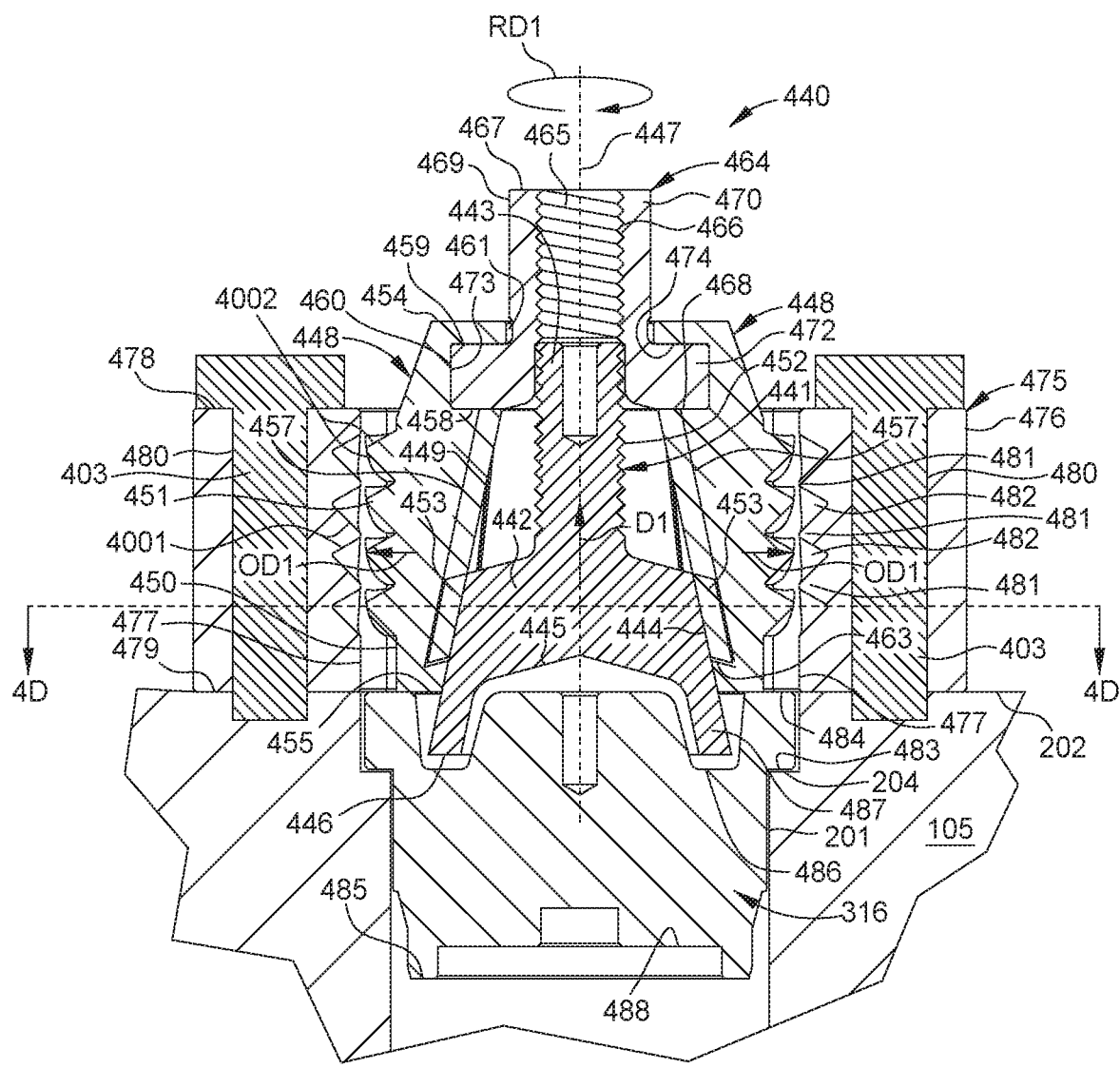
FIG. 4B is a schematic enlarged cross-sectional partial view of the fluid end and the locking assembly illustrated in FIG. 4A, according to one implementation.

FIG. 4B is a schematic enlarged cross-sectional partial view of the fluid end 100 and the locking assembly 440 illustrated in FIG. 4A, according to one implementation. The locking assembly 440 is illustrated in the unlocked position in FIG. 4B. The locking assembly 440 includes a second actuator 441. The second actuator 441 includes a body 442 and a shaft 443 that protrudes upwardly from the body 442 in a longitudinal direction D1. In one example, the body 442 is a base of the second actuator 441. The body 442 includes one or more tapered interfacing surfaces 444 and a recessed surface 445 formed in a lower surface 446 of the body 442. The second actuator 441 also includes a center axis 447 extending through the body 442 and the shaft 443. The center axis 447 extends through a center of the second actuator 441. The tapered interfacing surfaces 444 of the body 442 of the second actuator 441 taper inward relative to the center axis 447 and upward in the longitudinal direction D1. The second actuator 441 includes one or more coupling surfaces 452. In one example, the one or more coupling surfaces 452 include a threaded outer surface of the shaft 443. The second actuator 441 also includes a plurality of guide blocks 453 (shown in ghost in FIG. 4B). In the implementation shown, the guide blocks 453 are protrusions that are integrally formed with the second actuator 441 and protruding from the tapered interfacing surfaces 444. The present disclosure contemplates that the guide blocks 453 may be components separate from the second actuator 441 that are coupled, such as by using fasteners, to the second actuator 441.

The locking assembly 440 includes a plurality of wedges 448 disposed about the second actuator 441. Each wedge 448 includes a tapered interfacing surface 449, an outer surface 450, and a set of one or more external locking surfaces 4002 formed in the outer surface 450. The external locking surfaces 4002 are angled. In one embodiment, which can be combined with other embodiments, each set of one or more external locking surfaces 4002 is part of a set of external teeth 451. The tapered interfacing surface 449 of each wedge 448 is engaged with one of the tapered interfacing surfaces 444 of the second actuator 441 such that the tapered interfacing surfaces 444 slide upward and downward along the tapered interfacing surfaces 449 of the wedges 448.

In one embodiment, which can be combined with other embodiments, the one or more tapered interfacing surfaces 444 include one or more tapered outer surfaces and the one or more tapered interfacing surfaces 449 include one or more tapered inner surfaces.

The tapered interfacing surface 449 of each wedge 448 tapers inward relative to the center axis 447 and upward in the longitudinal direction D1. The longitudinal direction D1 extends upward and away from the fluid end body 105. Each wedge 448 includes an upper surface 454, a lower surface 455, a first guide slot 456 (illustrated in FIG. 4D), and a second guide slot 457 (shown in ghost in FIG. 4B). Each wedge 448 includes a first shoulder 458, a second shoulder 459 disposed above the first shoulder 458, and a recessed surface 460 formed by a recess in an inner surface 461 of the respective wedge 448. The tapered interfacing surface 449 of each wedge 448 extends from the first shoulder 458 of the respective wedge 448 to the lower surface 455. The first guide slot 456 and the second guide slot 457 of each wedge 448 extend from the first shoulder 458 and end short of the lower surface 455 to form a third shoulder 462 (shown in FIG. 4H) and a fourth shoulder 463 (shown in ghost in FIG. 4B), respectively. The present disclosure contemplates that the formation of the guide blocks 453 and the first and second guide slots 456, 457 may be reversed such that the guide blocks 453 are disposed on the wedges 448 and the first and second guide slots 456, 457 are formed on the second actuator 441. The guide blocks 453 of the implementation shown hereafter will be referred to as "the protrusions 453."

The locking assembly 440 includes a first actuator 464 disposed at least partially above the second actuator 441 and at least partially about the shaft 443 of the second actuator 441. The first actuator 464 includes a central opening 465 and one or more coupling surfaces 466. In one example, the one or more coupling surfaces 466 include a threaded inner surface interface with and thread with the threaded outer surface of the shaft 443 of the second actuator 441. The one or more coupling surfaces 466 interface with and are disposed in coupling engagement with the one or more coupling surfaces 452 of the second actuator 441. The first actuator 464 includes an upper surface 467 and a lower surface 468. The central opening 465 extends between the upper surface 467 and the lower surface 468. The first actuator 464 includes a tool interface 469, such as a hex tool interface, for turning the first actuator 464. The lower surface 468 of the first actuator 464 is engaged with the first shoulder 458 of each wedge 448 of the plurality of wedges 448. In one example, the first actuator 464 includes a first portion 470 and a second portion 472 disposed below the first portion 470. The second portion 472 is wider than the first portion 470. The second portion 472 includes an outer surface 473 and an upper surface 474 between the lower surface 468 and the upper surface 467 of the first portion 470. The outer surface 473 of the second portion 472 may be engaged with the recessed surface 460 of each wedge 448 and the upper surface 474 of the second portion 472 may be engaged with the second shoulder 459 of each wedge 448. In one example, the first actuator 464 is a nut and the second shoulder 459 of each wedge 448 is omitted.

The second actuator 441 is disposed at least partially below the first actuator 464 in the implementations shown in FIGS. 4B and 4C. In one embodiment, which can be combined with other embodiments, the second actuator 441 is disposed at least partially above the first actuator 464. In one embodiment, which can be combined with other embodiments, the second actuator 441 is not disposed above or below the first actuator 464 but is disposed about or within the first actuator 464.

The locking assembly 440 includes a lock ring 475 disposed about the plurality of wedges 448. In one example, the lock ring 475 is a flange. The lock ring 475 includes an outer surface 476 and a plurality of inner surfaces 477, an upper surface 478, and a lower surface 479. The lock ring 475 includes a plurality of fastener openings 480 extending from the upper surface 478 to the lower surface 479 of the lock ring 475. A bolt 403 of a plurality of bolts 403 is disposed through each fastener opening 480 to fasten the lock ring 475 to the fluid end body 105 and mount the lock ring 475 to an exterior surface 202 of the fluid end body 105. The lock ring 475 includes a set of one or more internal locking surfaces 4001 formed in each inner surface 477. The internal locking surfaces 4001 are angled. In one embodiment, which can be combined with other embodiments, each set of one or more internal locking surfaces 4001 is a part of a set of internal teeth 481. Each set of internal teeth 481 is formed between a set of internal grooves 482 formed in the inner surface 477. The present disclosure contemplates that the lock ring 475 may be a separate component from the fluid end body 105, or that the lock ring 475 may be integrally formed with the fluid end body 105. The present disclosure contemplates that the lock ring 475 may be disposed adjacent the opening 201 such that the sets of internal locking surfaces 4001 and the sets of internal grooves 482 are disposed along the opening 201 of the fluid end body 105. The lock ring 475 may also include an opening that is used with a handle, such as a T-shaped handle, to lift, lower, and move the locking assembly 475. The lock ring 475 may omit the fastener openings 480, such as in an embodiment where the lock ring 475 is welded to the fluid end body 105 or an embodiment where the lock ring 475 is integrally formed with the fluid end body 105.

FIG. 4B illustrates the valve cover 316 disposed in the opening 201. The valve cover 316 includes a shoulder 483 that engages an inner shoulder 204 of the fluid end body 105. The valve cover 316 includes an upper surface 484 and a lower surface 485. The valve cover 316 includes a channel 486 formed in the upper surface 484. The channel 486 receives a portion 487 of the body 442 of the second actuator 441 when the locking assembly 440 is in the unlocked position. The valve cover 316 includes a recessed surface 488 formed in the lower surface 485. The recessed surface 488 engages the spring 210 (illustrated in FIG. 4A).

FIG. 4B illustrates the locking assembly 440 in the unlocked position. When the locking assembly 440 is in the unlocked position, the second actuator 441 is in a lower position and the wedges 448 are in an unlocked position. In the unlocked position, the external locking surfaces 4002 of the wedges 448 are disengaged from and disposed at a gap from the internal locking surfaces 4001 of adjacent sets of internal grooves 482 formed in the lock ring 475. The lock ring 475 is mounted to the fluid end body 105 using the bolts 403 that mount the lock ring 475 to the exterior surface 202. The lower surface 455 of each wedge 448 is disposed in engagement with the upper surface 484 of the valve cover 316. When the locking assembly 440 is in the unlocked position and the wedges 448 are in the unlocked position, the second actuator 441, the first actuator 464, and the wedges 448 may be inserted into the lock ring 475 or removed from the lock ring 475 as an assembly.

The first actuator 464 is turned in a first rotational direction RD1 about the center axis 447. The first actuator 464 is turned using for example the tool interface 469. As the lower surface 468 of the first actuator 464 is engaged with the first shoulders 458 of the wedges 448, turning the first actuator 464 to rotate the first actuator 464 moves (such as by threading) the one or more coupling surfaces 452 of the second actuator 441 upward and into the one or more coupling surfaces 466 of the first actuator 464. The threading of the second actuator 441 into the first actuator 464 moves the second actuator 441 upward in the longitudinal direction D1 from the lower position to an upper position (illustrated in FIG. 4C). The second actuator 441 moves upward in the longitudinal direction D1 relative to the valve cover 316, the fluid end body 105, the lock ring 475, the wedges 448, and the first actuator 464. As the second actuator 441 moves upward in the longitudinal direction D1, the tapered interfacing surfaces 444 slide upward along the tapered interfacing surfaces 449 of the wedges 448 and apply outward forces to the wedges 448 to push the wedges 448 outward.

Figure 4C:
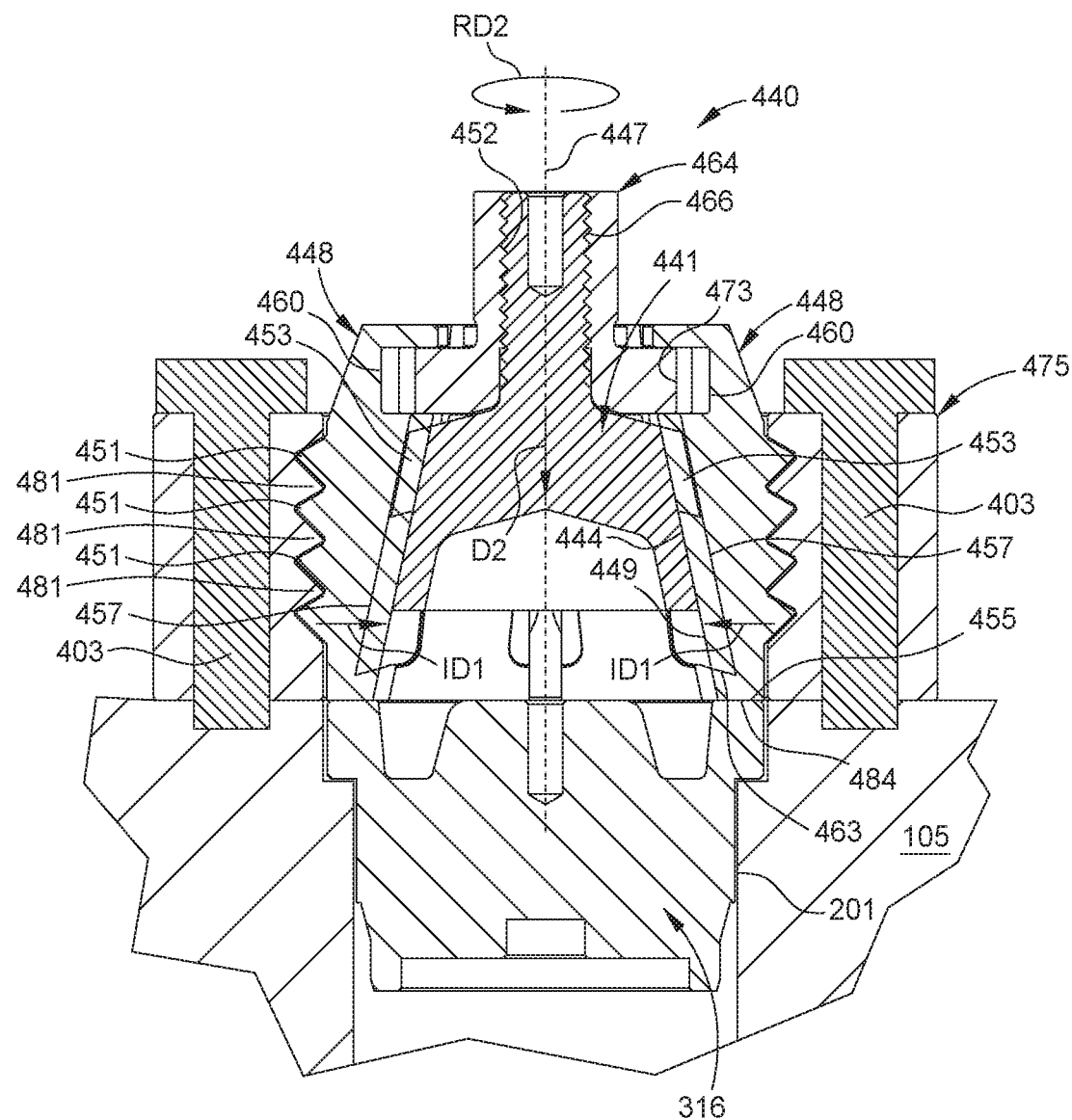
FIG. 4C is a schematic enlarged cross-sectional partial view of the fluid end and the locking assembly illustrated in FIG. 4B, with the locking assembly in a locked position, according to one implementation.

As the second actuator 441 moves upward from the lower position to the upper position, the wedges 448 move outward in outward directions OD1 from the unlocked position to a locked position (illustrated in FIG. 4C). The wedges 448 move outward in outward directions OD1 from the second actuator 441 to the lock ring 475. As the wedges 448 move outward, the lower surface 455 of each wedge 448 slides along the upper surface 484 of the valve cover 316 and outward in one of the outward directions OD1. As the wedges 448 move outward, each set of external locking surfaces 4002 moves toward one of the sets of internal locking surfaces 4001 and one of the sets of internal grooves 482.

FIG. 4C is a schematic enlarged cross-sectional partial view of the fluid end 100 and the locking assembly 440 illustrated in FIG. 4B, with the locking assembly 440 in a locked position, according to one implementation. When the locking assembly 440 is in the locked position, the second actuator 441 is in the upper position and the wedges 448 are in the locked position, as illustrated in FIG. 4C. In the locked position, the outer surface 473 of the first actuator 464 is disposed at a gap from the recessed surface 460 of each wedge 448. In the locked position, the teeth of the sets of external teeth 451 of the wedges 448 are engaged with and received in the recesses of the sets of internal grooves 482. In the locked position, the external locking surfaces 4002 of the wedges 448 are engaged with the internal locking surfaces 4001 of the recesses of the sets of internal grooves 482. In the locked position, the teeth of the sets of external teeth 451 of the wedges 448 are at least partially between the teeth of the sets of internal teeth 481 of the lock ring 475. In the locked position, the teeth of the sets of internal teeth 481 of the lock ring 475 are interleaved between the teeth of the sets of external teeth 451 of the wedges 448. As the wedges 448 move outward from the unlocked position to the locked position, the external locking surfaces 4002 of the wedges 448 moved outward and downward along the internal locking surfaces 4001 to align the teeth of the sets of external teeth 451 in the internal grooves 482 of the lock ring 475.

In the locked position, the external locking surfaces 4002 engaged with the internal locking surfaces 4001 and the lower surfaces 455 of the wedges 448 engaged with the upper surface 484 of the valve cover 316 facilitate retaining the valve cover 316 in the opening 201 and into sealing engagement with the fluid end body 105. For example, the external locking surface 4002 engaged against the internal locking surfaces 4001 of the lock ring 475 facilitates retaining the wedges 448 in a substantially fixed position relative to the fluid end body 105, and the engagement between the lower surfaces 455 and the upper surface 484 facilitates retaining the valve cover 316 in a substantially fixed position relative to the fluid end body 105. The wedges 448 may apply retaining surfaces directly (such as through the lower surfaces 455 and the upper surface 484) or indirectly to the valve cover 316. The aspects also facilitate preventing the valve cover 316 from backing out of the opening 201 during high pressure operations of the fluid end 100. In the locked position, the second actuator 441, the first actuator 464, and the wedges 448 are retained within the lock ring 475. The locking assembly 440 including the wedges 448 are mounted to the fluid end body 105 in the locked position using at least the lock ring 475 mounted to the fluid end body 105. The aspects of the locking assembly 440 facilitate preventing backing out of the valve covers 316 and maintaining sealed connections of the fluid end 100 during high pressure operations of the fluid end 100.

The locking assembly 440 may be moved from the locked position (illustrated in FIG. 4C) back to the unlocked position (illustrated in FIG. 4B), for example, to remove the valve cover 316 from the fluid end body 105 and/or to perform maintenance on the fluid end 100. The locking assembly 440 may be moved back to the unlocked position such that the second actuator 441, the first actuator 464, and the wedges 448 may be removed as an assembly from the central opening 496 (illustrated in FIG. 4G) of the lock ring 475. The locking assembly 440 is moved back to the unlocked position by turning the first actuator 464 in a second rotational direction RD2 that is opposite of the first rotational direction RD1. Turning the first actuator 464 in the second rotational direction RD2 moves (such as by threading) the one or more coupling surfaces 452 of the second actuator 441 out of the one or more coupling surfaces 466 of the first actuator 464. Threading the second actuator 441 out of the first actuator 464 moves the second actuator 441 downward in a downward longitudinal direction D2 that is opposite of the longitudinal direction D1. The second actuator 441 moves downward from the upper position back to the lower position. As the second actuator 441 moves downward, the tapered interfacing surfaces 444 slide downward along the tapered interfacing surfaces 449 of the wedges 448. As the second actuator 441 moves downward, the protrusions 453 that protrude from the second actuator 441 apply an inward force to each wedge 448 to pull the wedges inward in inward directions ID1 toward the center axis 447 and from the lock ring 475. As the wedges 448 move inward, the lower surfaces 455 slide inward in the inward directions ID1 toward the center axis 447.

The ability of the second actuator 441 to move in the longitudinal direction D1 and the opposite second longitudinal direction D2, and the ability of the first actuator 464 to move in opposite first and second rotational directions RD1 and RD2, facilitate moving the locking assembly 440 to the unlocked position if the locking assembly 440 becomes locked up and stuck in the locked position due to frictional forces.

Aspects of the first actuator 464, such as one or more of the lower surface 468, the upper surface 474, and/or the outer surface 473, facilitate guiding the wedges 448 horizontally as the wedges 448 move between the locked position and the unlocked position. The first actuator 464 may include guide members, such as protrusions or grooves that interface with protrusions or grooves of the wedges 448, to horizontally guide the wedges 448.

Figure 4D:
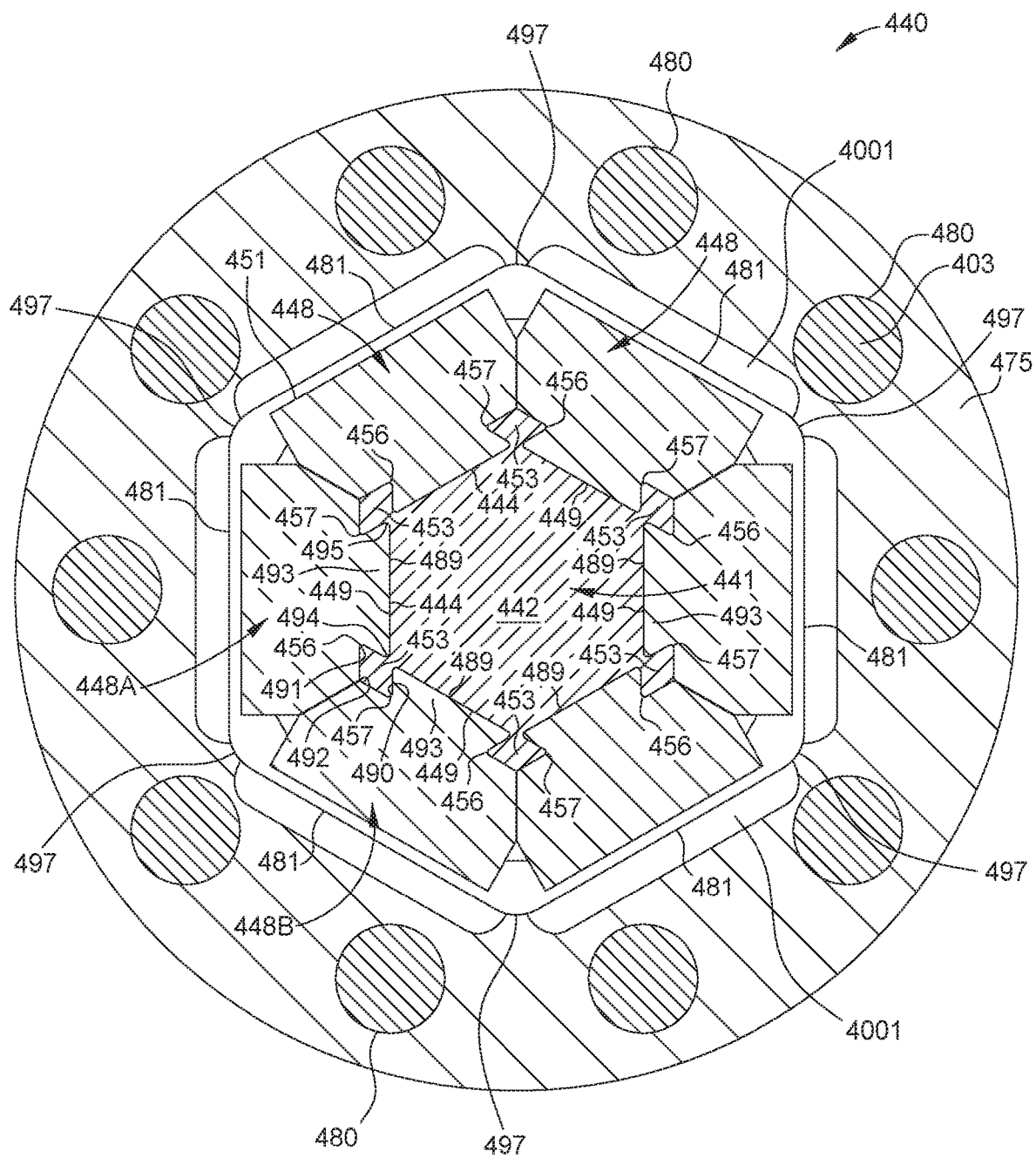
FIG. 4D is a schematic cross-sectional view of the locking assembly illustrated in FIG. 4A along lines 4D-4D, with the locking assembly in the unlocked position, according to one implementation.

FIG. 4D is a schematic cross-sectional view of the locking assembly 440 illustrated in FIG. 4A along lines 4D-4D, with the locking assembly 440 in the unlocked position, according to one implementation. The lock ring 475 includes ten fastener openings 480 disposed circumferentially about the lock ring 475, and ten bolts 403 disposed in the fastener openings 480. The lock ring 475 includes six inner surfaces 477, six sets of one or more internal locking surfaces 4001, and six sets of internal teeth 481 disposed hexagonally about the wedges 448 and the second actuator 441. The locking assembly 440 includes six wedges 448 disposed hexagonally about the second actuator 441. The body 442 of the second actuator 441 includes the plurality of protrusions 453 (six are shown) disposed hexagonally about the body 442. The body 442 includes six tapered interfacing surfaces 444. The body 442 also includes a plurality of slots 489 (six are shown) between the protrusions 453. Each protrusion 453 is disposed at least partially between two adjacent wedges 448 of the plurality of wedges 448. Each protrusion 453 includes a first edge 490 that protrudes at least partially into the first guide slot 456 of a first wedge 448A of the plurality of wedges and a second edge 491 that protrudes at least partially into the second guide slot 457 of a second wedge 448B that is adjacent the first wedge 448A. Each protrusion 453 includes a third edge 492 disposed outward of the first edge 490 and the second edge 491. The third edge 492 interfaces with a wedge interface where the respective first wedge 448A interfaces with the second wedge 448B when the wedges 448 are in the unlocked position.

Each wedge 448 includes the first guide slot 456 and the second guide slot 457 formed in the tapered interfacing surface 449 of the respective wedge 448. The first guide slot 456 and the second guide slot 457 are formed into the tapered interfacing surface 449 of each wedge 448 to form a protrusion 493 (six are shown) of each wedge that includes the tapered interfacing surface 449. The protrusion 493 of each wedge 448 protrudes at least partially into and is disposed in a slot 489 of the plurality of slots 489 of the second actuator 441. Each protrusion 493 of each wedge 448 includes a first edge 494 and a second edge 495.

As the second actuator 441 moves upward from the lower position to the upper position and the tapered interfacing surfaces 444 slide upward along the tapered interfacing surfaces 449, the tapered interfacing surfaces 444 apply outward forces to each tapered interfacing surface 449 to push each wedge 448 outward to the locked position. Additionally, each protrusion 453 of the second actuator 441 applies an outward force to the first guide slot 456 and the second guide slot 457 of each wedge 448 to push the wedge 448 outward to the locked position. Each protrusion 453 moves upward in the respective first guide slot 456 and second guide slot 457 as the second actuator 441 moves upward from the lower position to the upper position. As the second actuator 441 moves downward from the upper position to the lower position and the tapered interfacing surfaces 444 slide downward along the tapered interfacing surfaces 449, the protrusions 453 apply an inward force to each protrusion 493 of each wedge 448 to pull each wedge 448 inward to the unlocked position. Each protrusion 453 moves downward in the respective first guide slot 456 and second guide slot 457 as the second actuator 441 moves downward from the upper position to the lower position.

In one embodiment, which can be combined with other embodiments, the protrusions 453 that protrude from the tapered interfacing surfaces 444 are dovetail pins of the second actuator 441 and the slots 489 are dovetail tails of the second actuator 441 that are disposed between the dovetail pins. In one embodiment, which can be combined with other embodiments, the protrusion 493 of each wedge 448 is a dovetail pin of the respective wedge 448. In such embodiments, the first guide slot 456 of a first wedge 448A and the second guide slot 457 of an adjacent second wedge 448B form a dovetail tail between the dovetail pins of the wedges 448. The dovetail pins of the second actuator 441 are disposed in the dovetail tails of the wedges 448, and the dovetail pins of the wedges 448 are disposed in the dovetail tails of the second actuator 441 to form a plurality of dovetail joints.

In one embodiment, which can be combined with other embodiments, the protrusions 453 that protrude from the tapered interfacing surfaces 444 are tee-shaped protrusions of the second actuator 441 and the slots 489 are tee-shaped slots of the second actuator 441 that are disposed between the tee-shaped protrusions. In one embodiment, which can be combined with other embodiments, the protrusion 493 of each wedge 448 is a tee-shaped protrusion of the respective wedge 448. In such embodiments, the first guide slot 456 of a first wedge 448A and the second guide slot 457 of an adjacent second wedge 448B form a tee-shaped guide slot between the dovetail pins of the wedges 448. The tee-shaped protrusions of the second actuator 441 are disposed in the tee-shaped guide slots of the wedges 448, and the tee-shaped protrusions of the wedges 448 are disposed in the tee-shaped slots of the second actuator 441 to form a plurality of tee-shaped joints.

The joints formed by the protrusions 453 and the slots 489 of the second actuator 441, and the protrusions 493 and the first and second guide slots 456, 457 of the wedges 448, facilitate the movement of the wedges 448 between the unlocked position and the locked position closely following the movement of the second actuator 441 between the upper position and the lower position as the first actuator 464 is turned. The close following facilitates reliable unlocking and locking of the locking assembly 440 to maintain the valve cover 316 in sealing engagement with the fluid end body 105 during high pressure operations. The joints also facilitate pulling the wedges 448 inward from the locked position to the unlocked position as the first actuator 464 is turned without using springs or other biasing elements to bias the wedges 448 inward. Reducing the need for biasing elements to bias the wedges 448 inward reduces cost, increases efficiencies, simplifies the design of the locking assembly, and facilitates easier manual operation of the locking assembly 440 and reduced operations times. The present disclosure, however, contemplates that springs or other biasing elements may be used in conjunction with the locking assembly 440 to facilitate operations of the locking assembly 440.

Figure 4E:
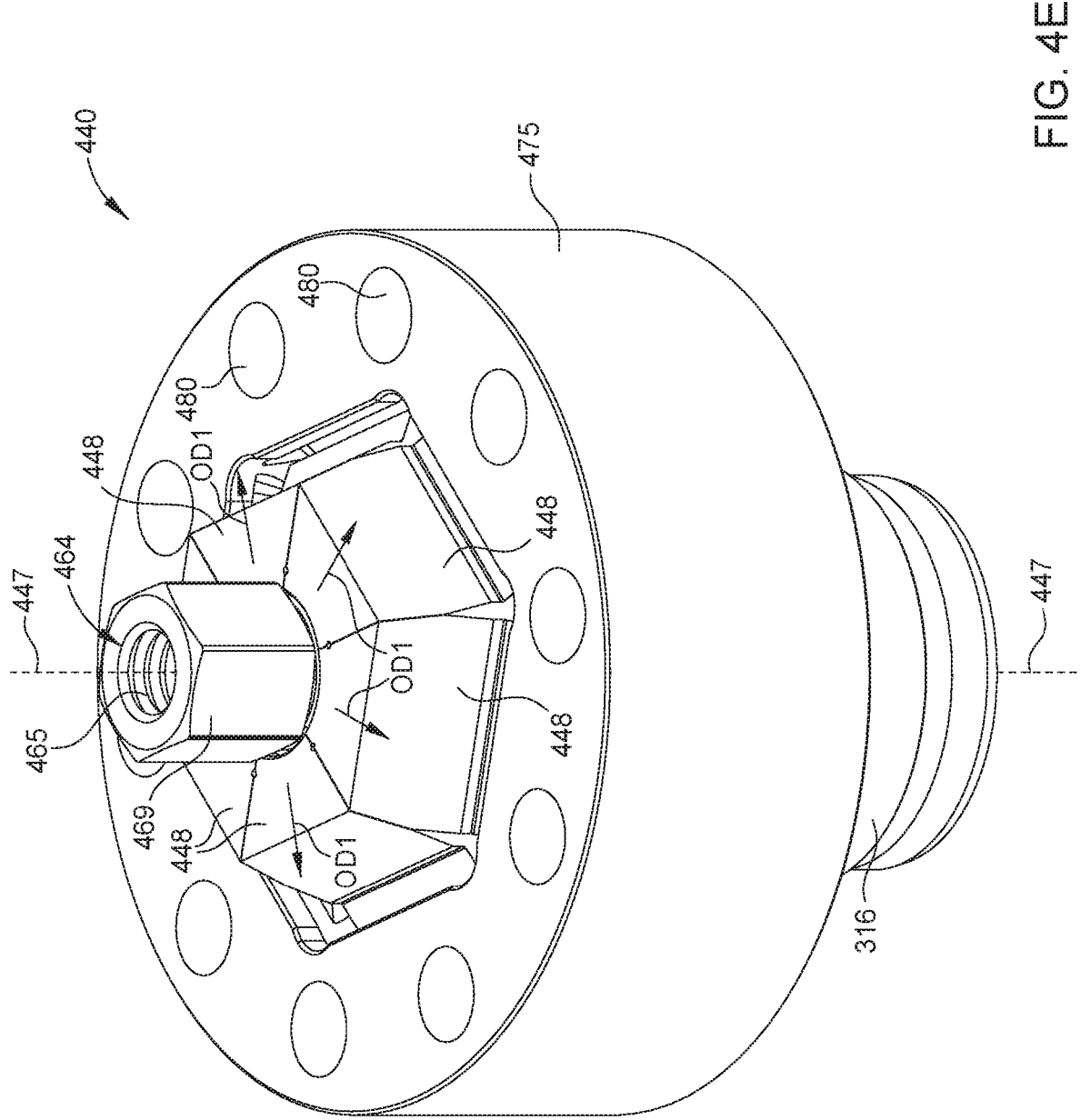
FIG. 4E is a schematic isometric partial view of the locking assembly and the valve cover illustrated in FIGS. 3 and 4A, with the locking assembly in the unlocked position, according to one implementation.

FIG. 4E is a schematic isometric partial view of the locking assembly 440 and the valve cover 316 illustrated in FIGS. 3 and 4A, with the locking assembly 440 in the unlocked position, according to one implementation.

Figure 4F:
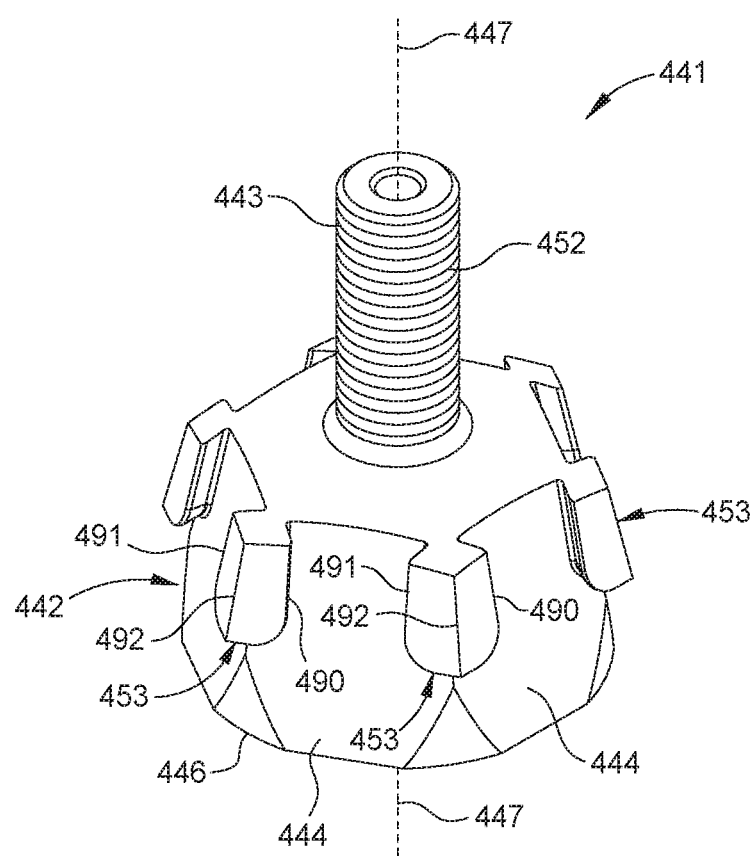
FIG. 4F is a schematic isometric partial view of the second actuator of the locking assembly, according to one implementation.

FIG. 4F is a schematic isometric partial view of the second actuator 441 of the locking assembly 440, according to one implementation. Each protrusion 453 protruding from the body 442 of the second actuator 441 is disposed at an intersection of two of the tapered interfacing surfaces 444. In one embodiment, which can be combined with other embodiments, the one or more tapered interfacing surfaces 444 taper inward and upward toward the center axis 447 in the longitudinal direction D1. In one example, the one or more tapered interfacing surfaces 444 are neither parallel nor perpendicular to the center axis 447.

Figure 4G:
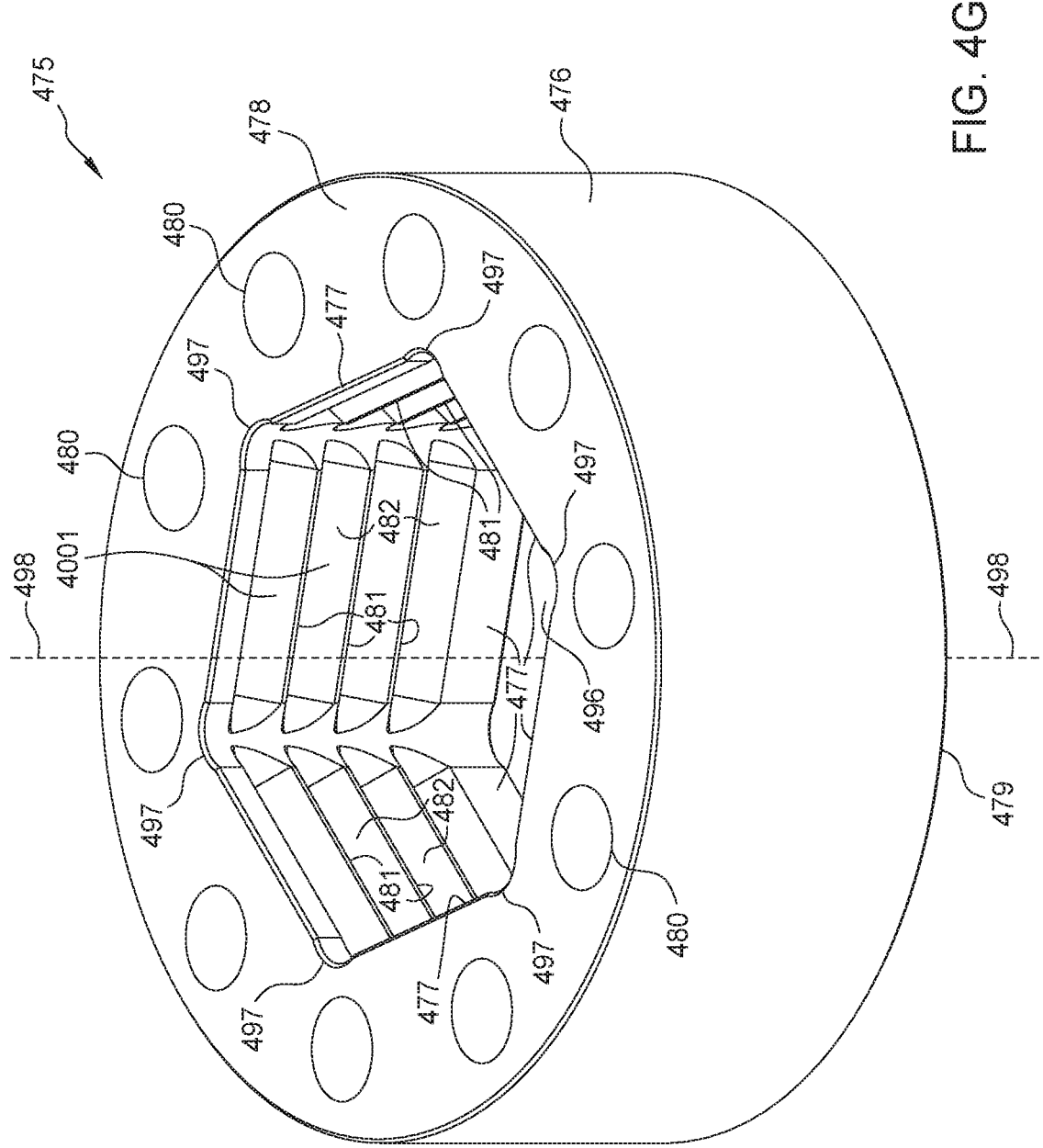
FIG. 4G is a schematic isometric partial view of the lock ring of the locking assembly, according to one implementation.

FIG. 4G is a schematic isometric partial view of the lock ring 475 of the locking assembly 440, according to one implementation. The lock ring 475 includes a central opening 496 that extends from the upper surface 478 to the lower surface 479. The central opening 496 is hexagonal in shape. The lock ring 475 includes six inner surfaces 477 formed hexagonally about the central opening 496. The lock ring 475 includes rounded surfaces 497 formed between the inner surfaces 477. Each rounded surface 497 is formed between two adjacent inner surfaces 477. Each set of internal grooves 482 (six are included in the lock ring 475) is formed in one of the inner surfaces 477. Each set of internal teeth 481 (six are included in the lock ring 475) is formed in one of the inner surfaces 477 between the internal grooves of a set of internal grooves 482. Each set of internal locking surfaces 4001 (six are included in the locking ring 475) formed in one of the inner surfaces 477. The lock ring 475 includes a center axis 498 extending through the central opening 496 and through a center of the ring. The center axis 498 of the lock ring 475 is longitudinally aligned with the center axis 447 of the second actuator 441 in the locking assembly 440, as illustrated in FIGS. 4B and 4C.

Figure 4H:
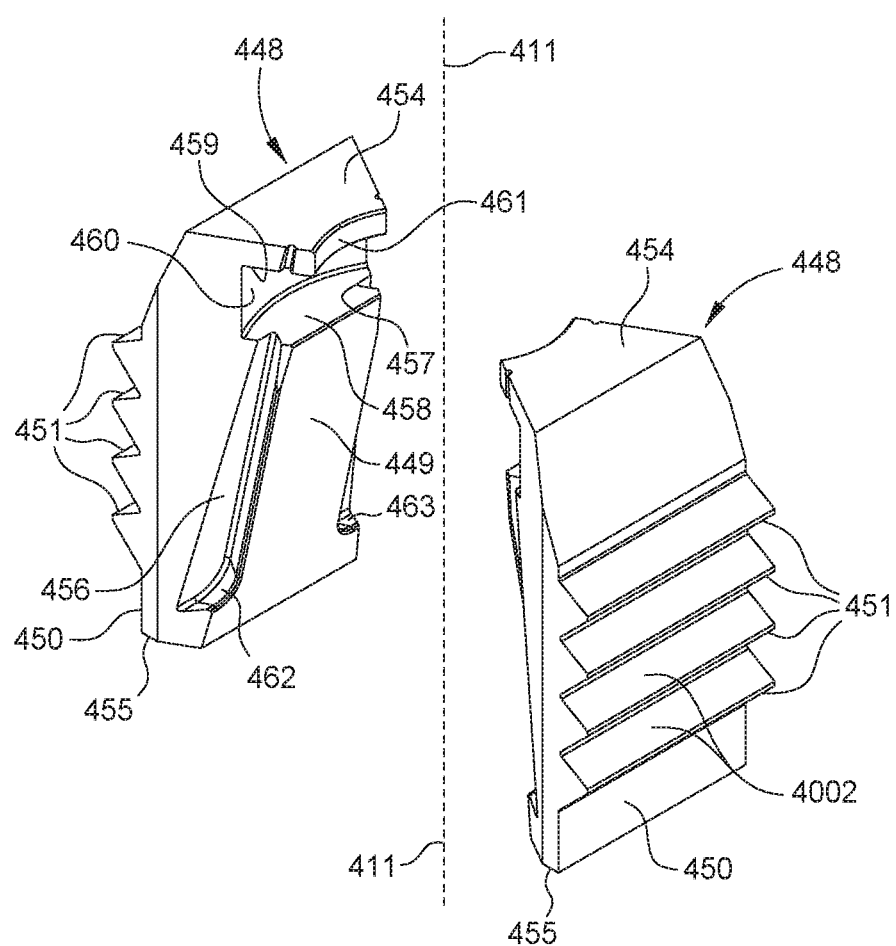
FIG. 4H is a schematic isometric partial view of two of the wedges of the locking assembly, according to one implementation.

FIG. 4H is a schematic isometric partial view of two of the wedges 448 of the locking assembly 440, according to one implementation. The wedges 448 are disposed circumferentially about a longitudinal axis 411. The longitudinal axis 411 is longitudinally aligned with the center axis 447 of the second actuator 441 in the locking assembly 440, as illustrated in FIGS. 4B and 4C.

Figure 4I:
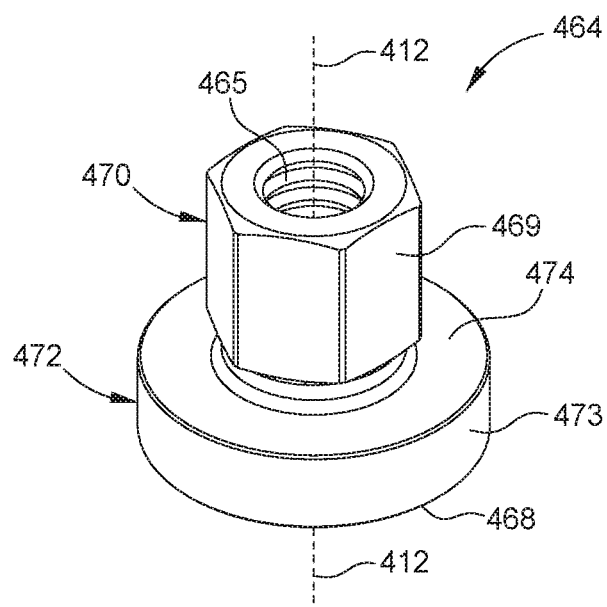
FIG. 4I is a schematic isometric partial view of the first actuator of the locking assembly, according to one implementation.

FIG. 4I is a schematic isometric partial view of the first actuator 464 of the locking assembly 440, according to one implementation. The first actuator 464 includes a center axis 412 extending through a center of the first actuator 464 and through the central opening 465. The center axis 412 is longitudinally aligned with the center axis 447 of the second actuator 441 in the locking assembly 440, as illustrated in FIGS. 4B and 4C. The upper surface 474 and the lower surface 468 of the second portion 472 extend perpendicularly to the center axis 412.

Figure 4J:
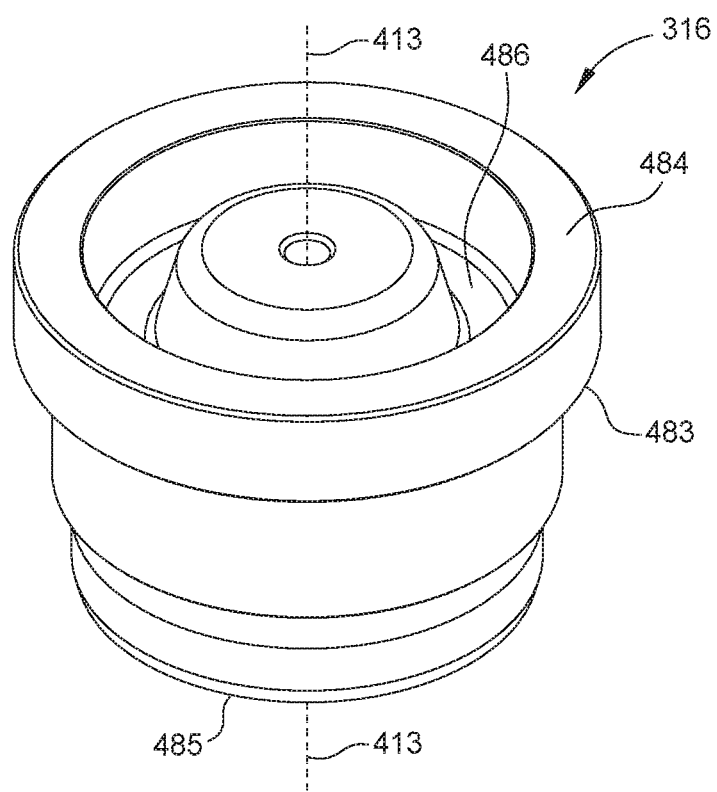
FIG. 4J is a schematic isometric partial view of the valve cover of the fluid end, according to one implementation.

FIG. 4J is a schematic isometric partial view of the valve cover 316 of the fluid end 100, according to one implementation. The valve cover 316 includes a center axis 413 extending through a center of the valve cover 316. The center axis 413 is longitudinally aligned with the center axis 447 of the second actuator 441 of the locking assembly 440, as illustrated in FIGS. 4B and 4C.

The present disclosure contemplates that the surfaces and slots described herein, such as the one or more tapered interfacing surfaces 444 and the tapered interfacing surfaces 449, may be planar in profile or arcuate in profile.

Figure 5A:
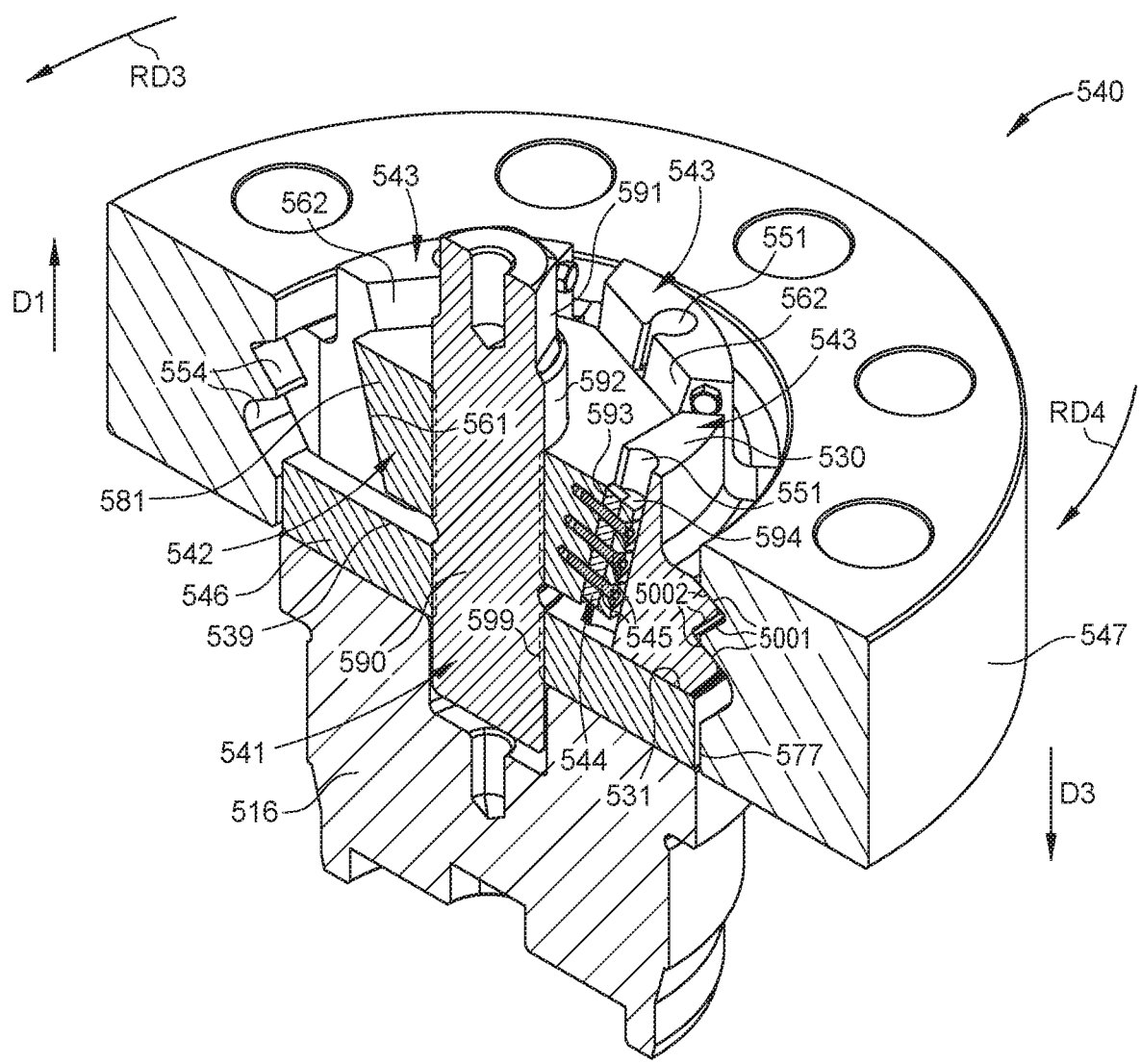
FIG. 5A is a schematic enlarged cross-sectional isometric view of a locking assembly in a locked position, according to one implementation.
Figure 5B:
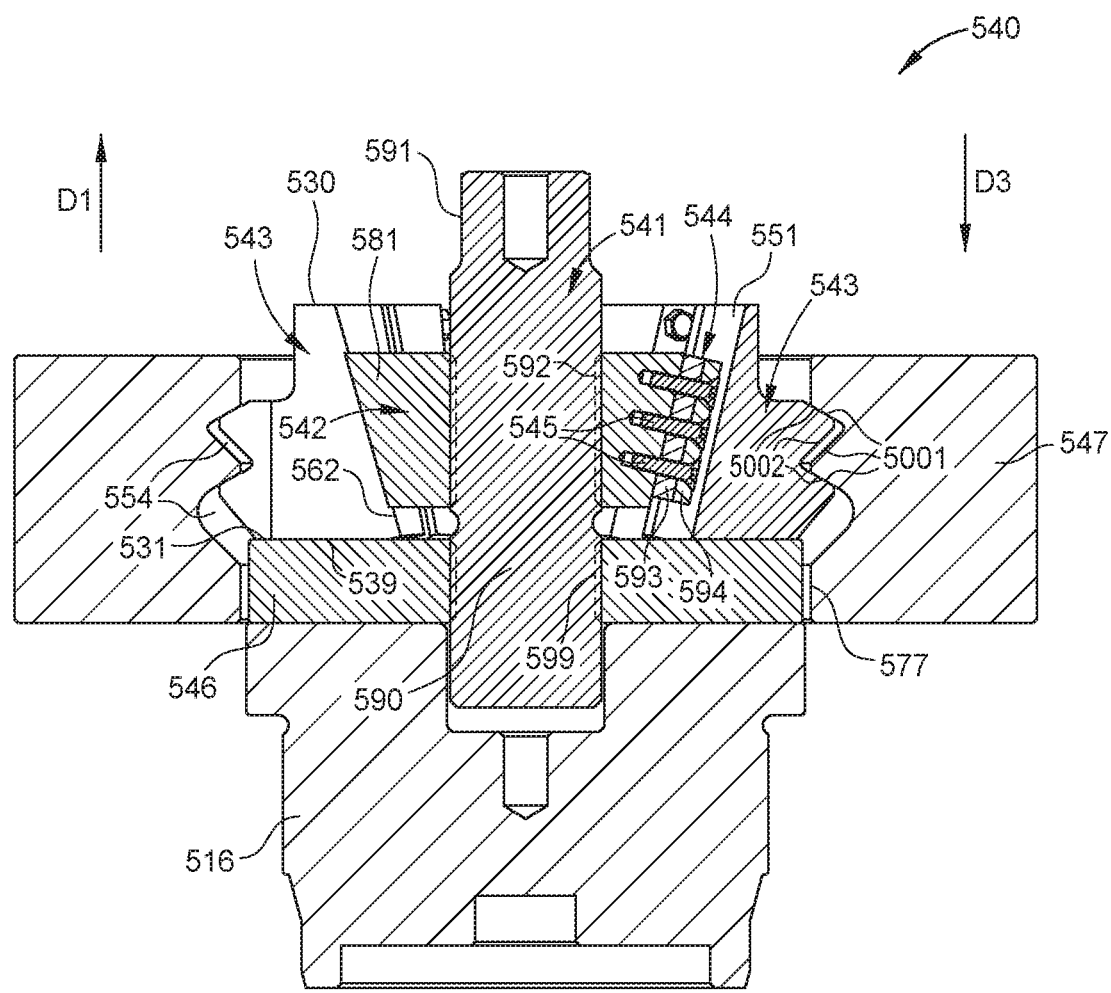
FIG. 5B is a schematic enlarged cross-sectional side view of the locking assembly in the locked position, according to one implementation.

FIG. 5A is a schematic enlarged cross-sectional isometric view of a locking assembly 540 in a locked position, according to one implementation. FIG. 5B is a schematic enlarged cross-sectional side view of the locking assembly 540 in the locked position, according to one implementation. The locking assembly 540 may be used in place of the locking assembly 240 and/or the locking assembly 440 described above. Referring to FIGS. 5A and 5B, the locking assembly 540 includes a first actuator 541, a second actuator 542 disposed about the first actuator 541, and a plurality of wedges 543 that are each coupled to the second actuator 542. The first actuator 541 is received in a central opening of the second actuator 542. One or more coupling surfaces (such as a threaded outer surface) of the first actuator 541 are disposed in coupling engagement with one or more coupling surfaces (such as a threaded inner surface) of the second actuator 542. The second actuator 542 includes a body 581 that is pentagonal in shape, including rounded or chamfered edges between the five sides of the pentagonal shape. The first actuator 541 includes a stud 590 that is rotatable. The stud 590 includes a hex portion 591 for interfacing with a tool, such as a wrench, and a threaded portion 592.

The body 581 includes one or more tapered interfacing surfaces 561. In one embodiment, which can be combined with other embodiments, the tapered interfacing surfaces 561 taper inwardly toward a center axis of the body 581 and downward in the longitudinal direction D3 that points toward the fluid end body 105. The present disclosure contemplates that use of "downward" or "downwardly" herein may be parallel to gravitational forces, or, depending on orientations of the locking assemblies, may be disposed at an oblique angle relative to the gravitational forces or disposed perpendicularly to gravitational forces.

The plurality of wedges 543 are coupled to the second actuator 542 by a plurality of guide blocks 544. Each guide block 544 may be formed of a single body, or a plurality of bodies coupled together. In the implementation shown in FIG. 5A, each guide block 544 includes a rectangular body 593 coupled to a second body 594 that includes one or more arcuate sides (such as two arcuate sides), such as one or more semi-circular sides. The one or more tapered interfacing surfaces 561 (five are included as part of the pentagonal shape) interface with and engage a set of one or more tapered interfacing surfaces 562 of each of the wedges 543 (five wedges 543 are included) such that the one or more tapered interfacing surfaces 561 slide upward and downward along the one or more tapered interfacing surfaces 562 of the wedges 543. In one embodiment, which can be combined with other embodiments, the one or more tapered interfacing surfaces 562 of each wedge 543 taper inward relative to the center axis of the body 581 and downward in the longitudinal direction D3. In one embodiment, which can be combined with other embodiments, the one or more tapered interfacing surfaces 561 include one or more tapered outer surfaces and the one or more tapered interfacing surfaces 562 include one or more tapered inner surfaces.

The guide blocks 544 (five guide blocks 544 are included) are coupled to the second actuator 542 (as shown in FIG. 5A) by a plurality of fasteners 545, such as screws. The fasteners 545 extend through the respective guide block 544 and partially through the body 581 of the second actuator 542. In one embodiment, which can be combined with other embodiments, the guide blocks 544 may be integrally formed with the second actuator 542. In one example, the guide blocks 544 are integrally formed with the second actuator 542 such that each guide block 544 is a protrusion that protrudes from the tapered interfacing surface 561. Each wedge 543 includes an upper surface 530, a lower surface 531, and a guide slot 551 formed in the tapered interfacing surface 562 of the respective wedge 543. The tapered interfacing surface 562 of each wedge 543 extends from the lower surface 531 each respective wedge 543 to the upper surface 530.

The guide blocks 544 are located at least partially within the guide slots 551 formed within each wedge 543 to rotationally couple the second actuator 542 to the plurality of wedges 543 but allow axial relative movement between the second actuator 542 and the plurality of wedges 543. The guide blocks 544 and the guide slots 551 form a guide mechanism configured to keep the wedges 543 coupled to the second actuator 542. The guide mechanism can be a dovetail, circular, or other shaped interface. In one embodiment, which can be combined with other embodiments, the guide mechanism can be reversed such that the guide slots 551 are formed on the second actuator 542 and the guide blocks 544 are coupled to or integrally formed with the wedges 543.

The plurality of wedges 543 have a set of one or more external locking surfaces 5002 that engage with one or more internal locking surfaces 5001 of a lock ring 547 and one or more internal grooves 554 (two are shown) formed on an inner surface 577 of the lock ring 547. In one embodiment, which can be combined with other embodiments, the locking surfaces 5002 are part of one or more external teeth formed on the wedges 543. The locking surfaces 5002 are angled. The plurality of wedges 543 are positioned on top of an upper surface 539 of a plate 546, which is positioned on top of a valve cover 516. In one example, the plate 546 is a ring, such as a load ring. In one embodiment, which can be combined with other embodiments, the plate 546 may be integrally formed with the valve cover 516 (or integrally formed with any other component, such as a plug, that is secured within the fluid end body 105).

Figure 5C:
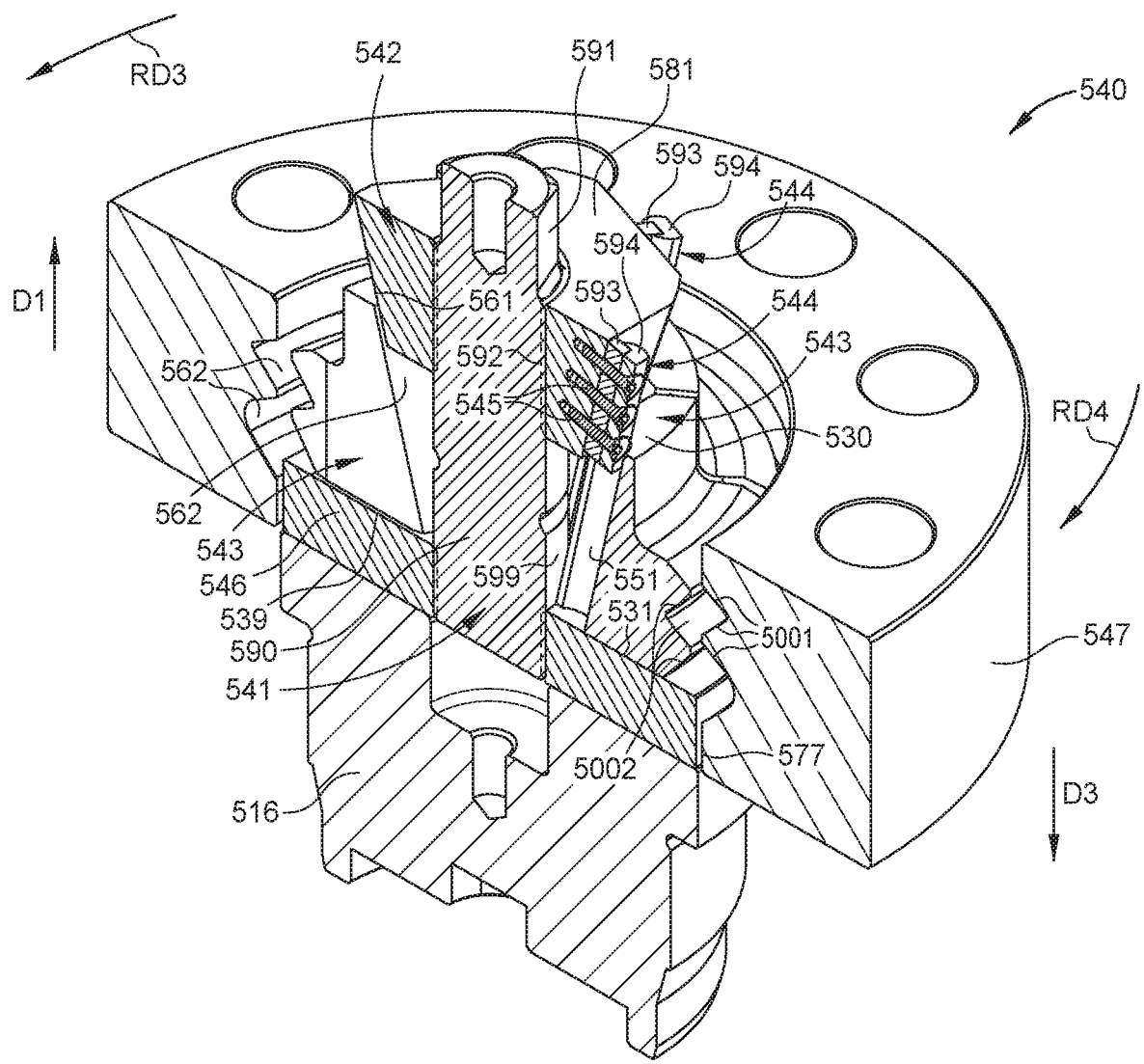
FIG. 5C is a schematic enlarged cross-sectional isometric view of the locking assembly in the unlocked position, according to one implementation.
Figure 5D:
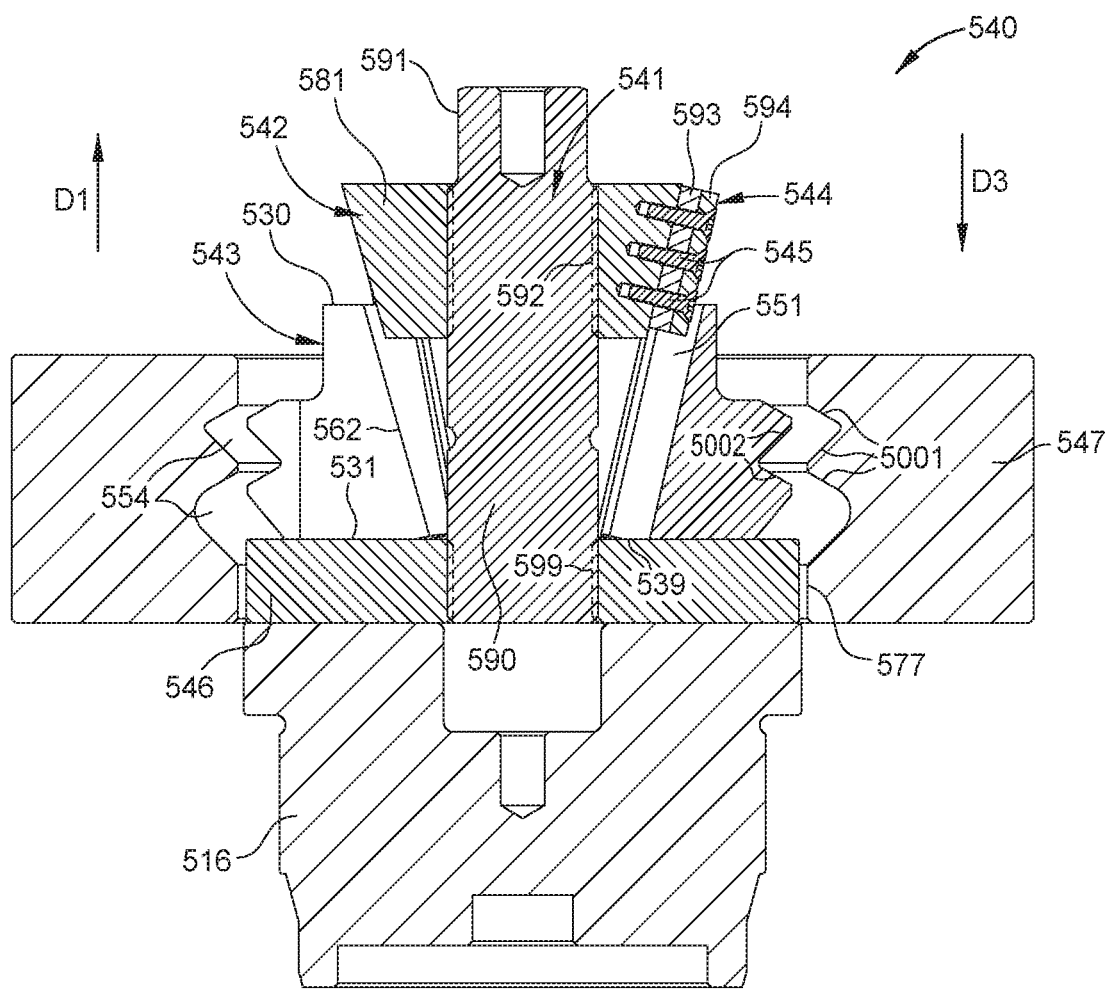
FIG. 5D is a schematic enlarged cross-sectional side view of the locking assembly in the unlocked position, according to one implementation.

FIGS. 5A and 5B illustrate the locking assembly 540 in the locked position, which secures the valve cover 516 within the fluid end body 105 during operation. FIGS. 5C and 5D illustrate the locking assembly 540 in an unlocked position when first attaching the locking assembly 540 to the fluid end body 105 or when wanting to remove and repair/replace the valve cover 516 or otherwise requiring access to the internal components of the fluid end 100.

When the locking assembly 540 is in the unlocked position, the second actuator 542 is in an upper position, the first actuator 541 is in an upper positions, and the plurality of wedges 543 are in an unlocked position. In the unlocked position, the external locking surfaces 5002 are disengaged from and disposed at a gap from the internal locking surfaces 5001 of adjacent internal grooves 554 formed in the lock ring 547. When the locking assembly 540 is in the unlocked position and the wedges 543 are in the unlocked position, the first actuator 541, the second actuator 542, and the wedges 543 may be inserted into the lock ring 547 or removed from the lock ring 547 as an assembly.

The operation of attaching the locking assembly 540 to the fluid end 100 and actuating the locking assembly 540 from the unlocked position to the locked position will now be described. The locking assembly 540 is attached to the fluid end body 105 by bolting the lock ring 547 to the fluid end body 105 such that the plate 546 is positioned on top of the valve cover 516. As stated above, the lock ring 547 may be integrally formed with the fluid end body 105 such that no bolting is required. The locking assembly 540 is in the unlocked position as shown in FIGS. 5C and 5D.

The first actuator 541 is then rotated (such as by a wrench used to grip and rotate the hex portion 591 of the first actuator 541) in a first rotational direction RD3 and relative to the second actuator 542 and the plurality of wedges 543 such that the second actuator 542 and the first actuator 541 is driven downward in the longitudinal direction D3 and toward the valve cover 516 via a threaded interface formed between the first actuator 541 and the second actuator 542. The threaded inner surface of the first actuator 541 engages the threaded outer surface of the second actuator 542 to form the threaded interface that moves the second actuator 242 upward or downward depending on the direction of rotation of the first actuator 541. The first actuator 541 may include a second threaded portion 599 that interfaces with a threaded inner surface of the plate 546. The second threaded portion 599 and the threaded portion 592 may be threaded in opposite directions such that both the first actuator 541 and the second actuator 542.

As the guide blocks 544 of the of the second actuator 542 are engaged with the wedges 543 using the guide slots 551, turning the first actuator 541 to rotate the first actuator 541 moves (such as by threading) the one or more coupling surfaces of the first actuator 541 (such as the threaded portion 592) upward and out of the one or more coupling surfaces (such as a threaded inner surface) of the second actuator 542. The threading of the first actuator 541 out of the second actuator 542 moves the second actuator 542 downward in the longitudinal direction D3 from the upper (shown in FIGS. 5C and 5D) position to the lower position. The second actuator 542 moves downward in the longitudinal direction D3 relative to the valve cover 516, the fluid end body 105, the lock ring 547, the plate 546, the wedges 543, and the first actuator 541. The rotation of the first actuator 541 also moves (such as by threading) the second threaded portion 599 downward and into the threaded inner surface of the plate 546.

In one embodiment, which can be combined with other embodiments, the first actuator 541 functions as a turnbuckle. In one example, threaded portion 592 includes a left-hand thread and the second threaded portion 599 includes a right-hand thread.

As the second actuator 542 is pushed downward in the longitudinal direction D3 by the first actuator 541, the tapered interfacing surfaces 561 of the second actuator 542 engage the tapered interfacing surfaces 562 of the wedges 543 and force the wedges 543 radially outward and into engagement with the lock ring 547. As the second actuator 542 moves downward in the longitudinal direction D3, the tapered interfacing surfaces 561 slide downward along the tapered interfacing surfaces 562 of the wedges 543 and apply outward forces to the wedges 543 to push the wedges 543 outward. The guide slots 551 and the guide blocks 544 are substantially parallel with the tapered surfaces 561, 562 of the second actuator 542 and the wedges 543.

As the second actuator 542 moves downward from the upper position to the lower position, the wedges 543 move outward from the unlocked position to the locked position. As the wedges 543 move outward, a lower surface 531 of each wedge 543 slides along the upper surface 539 of the plate 546 and outward. As the wedges 543 move outward, each set of external locking surfaces 5002 moves toward one of the internal grooves 554.

In the locked position, the external locking surfaces 5002 of the wedges 543 are engaged with and received in the internal grooves 554 formed on the inner surface 577 of the lock ring 547 to help secure the plate 546 and the valve cover 516 within the fluid end body 105. In one embodiment, which can be combined with other embodiments, the plate 546 and the valve cover 516 form an integral component. The external locking surfaces 5002 and the internal locking surfaces 5001 may be tapered surfaces that engage with each other as the wedges 543 moved from the unlocked position to the locked position. When the wedges 543 are moved radially outward into contact with the lock ring 547, the wedges 543 move slightly downward toward the fluid end body 105 to apply a force to the plate 546 and the valve cover 516 due to the tapered external locking surfaces 5002 engaging and moving along the tapered internal locking surfaces 5001 of the internal grooves 554. The wedges 543 may move slightly downward relative to the lock ring 547 since the lock ring 547 is bolted to (or integrally formed with) the fluid end body 105.

In the locked position, the internal teeth of the lock ring 547 are engaged with and at least partially between the external teeth of the wedges 543. In the locked position, the internal teeth of the lock ring 547 are interleaved between the external teeth of the wedges 543. In the locked position, external locking surfaces of the external locking surfaces 5002 of the wedges 543 are engaged with internal locking surfaces of the internal locking surfaces 5001 of the lock ring 547.

In the locked position, the external locking surfaces 5002 engaged with the internal locking surfaces 5001, the wedges 543 engaged with the plate 546, and the plate 546 engaged with the valve cover 516 facilitate retaining the valve cover 516 in the opening 201 and into sealing engagement with the fluid end body 105 during operation of the fluid end 100. For example, the external locking surfaces 5002 engaged against the internal locking surfaces 5001 facilitates retaining the wedges 543 in a substantially fixed position relative to the fluid end body 105, and the engagements between the wedges 543, the plate 546, and the valve cover 516 facilitate retaining the valve cover 516 in a substantially fixed position relative to the fluid end body 105. The wedges 543 may apply retaining surfaces directly or indirectly to the valve cover 516. The aspects also facilitate preventing the valve cover 516 from backing out of the opening 201 during high pressure operations of the fluid end 100. In the locked position, the wedges 543 and the second actuator 542 are retained within the lock ring 547. The locking assembly 540 including the wedges 543 is mounted to the fluid end body 105 in the locked position using at least the lock ring 547 mounted to the fluid end body 105. The aspects of the locking assembly 540 facilitate preventing backing out of the valve covers 516 and maintaining sealed connections of the fluid end 100 during high pressure operations of the fluid end 100.

FIG. 5C is a schematic enlarged cross-sectional isometric view of the locking assembly 540 in the unlocked position, according to one implementation.

FIG. 5D is a schematic enlarged cross-sectional side view of the locking assembly 540 in the unlocked position, according to one implementation.

Benefits of the present disclosure include at least unlocking the locking assembly 240 if the locking assembly 240 is locked up due to frictional forces; close following of the wedges 243 with the second actuator 242; quick operational times for the locking assembly 240; quick access to inside the fluid end body 105 for maintenance, replacement, and/or repair; reduced need of springs or other biasing elements; reduced costs; increased efficiencies; reduced operational and maintenance times for fluid ends; light weight for the locking assembly 240; ease of manual operation; long operational lifespans for the locking assembly 240; and maintained seal engagements at high operating pressures for fluid ends.

Aspects of the present disclosure include at least upward movement of the second actuator 242 to push the wedges 243 outward to the locked position; the guide blocks 244, guide slots 251, protrusions 453, first guide slots 456, and second guide slots 457 forming joints; the one or more tapered interfacing surfaces 261, 444 and the tapered interfacing surfaces 262, 449 tapering inward and upward in the longitudinal direction D1; the guide blocks 244 of the second actuator 242 pulling the wedges 243 inward; the engagement of the shoulder portions 249 with the internal groove 250 to horizontally guide the wedges 243; and applying downward retaining forces to the valve cover 116 using the wedges 243. It is contemplated that one or more of these aspects disclosed herein may be combined. Moreover, it is contemplated that one or more of these aspects may include some or all of the aforementioned benefits.

As an example, the present disclosure contemplates that one or more of the aspects, features, components, and/or properties of the locking assembly 240 may be combined with one or more of the aspects, features, components, and/or properties of the locking assembly 440 and/or the locking assembly 540.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A locking assembly for fluid ends, comprising:
    a first actuator, the first actuator comprising one or more coupling surfaces;
    a second actuator disposed at least partially below the first actuator, the second actuator comprising:
        a body, the body comprising one or more tapered interfacing surfaces;
        one or more coupling surfaces disposed in coupling engagement with the one or more coupling surfaces of the first actuator; and
        a center axis extending in a longitudinal direction through the body, wherein the one or more tapered interfacing surfaces taper inward at an angle relative to the center axis;
    a plurality of wedges disposed about the second actuator and movable between an unlocked position and a locked position, each wedge of the plurality of wedges comprising:
        a set of one or more external locking surfaces;
        a set of one or more tapered interfacing surfaces, wherein the one or more tapered interfacing surfaces of each wedge is configured to engage with one of the one or more tapered interfacing surfaces of the second actuator; and
    a lock ring disposed about the plurality of wedges, the lock ring comprising a set of one or more internal locking surfaces configured to engage with the external locking surfaces of each wedge of the plurality of wedges; and
    wherein the body of the second actuator comprises a plurality of guide blocks; and each wedge of the plurality of wedges comprises a guide slot formed in a respective tapered interfacing surface of the set of one or more tapered interfacing surfaces of the respective wedge, and each guide slot includes a guide block of the plurality of guide blocks disposed at least partially in the respective guide slot.

2. The locking assembly of claim 1, wherein the one or more coupling surfaces of the first actuator comprise a threaded inner surface, and the one or more coupling surfaces of the second actuator comprise a threaded outer surface of a shaft protruding upwardly from the body of the second actuator.

3. The locking assembly of claim 2, wherein the second actuator is movable upward in the longitudinal direction from a lower position to an upper position, and the plurality of wedges are movable outwardly from an unlocked position to a locked position, wherein the plurality of wedges are in the unlocked position when the second actuator is in the lower position, and the plurality of wedges are in the locked position when the second actuator is in the upper position.

4. The locking assembly of claim 1, wherein the lock ring is mounted to a fluid end body or integrally formed with the fluid end body, and each wedge of the plurality of wedges comprises a lower surface engaged with an upper surface of a valve cover disposed at least partially in an opening formed in the fluid end body.

5. The locking assembly of claim 1, wherein the lock ring is mounted to a fluid end body or integrally formed with the fluid end body, and the locking assembly further comprises a valve cover disposed at least partially in an opening formed in the fluid end body and a load ring positioned on top of or integrally formed with the valve cover, and each wedge of the plurality of wedges comprises a lower surface engaged with an upper surface of the load ring.

6. The locking assembly of claim 1, wherein each guide block of the plurality of guide blocks is coupled to the body of the second actuator using one or more fasteners.

7. The locking assembly of claim 1, wherein the plurality of guide blocks comprises protrusions integrally formed with the body of the second actuator and protruding from the one or more tapered outer surfaces.

8. A locking assembly for fluid ends, comprising:
    a first actuator, the first actuator comprising one or more coupling surfaces;
    a second actuator, the second actuator comprising:
        a body; and
        one or more coupling surfaces disposed in coupling engagement with the one or more coupling surfaces of the first actuator;
    a plurality of wedges disposed about the second actuator and movable between an unlocked position and a locked position, each wedge of the plurality of wedges comprising a set of one or more external locking surfaces;
    a guide mechanism formed between the second actuator and the plurality of wedges, the guide mechanism comprising a plurality of guide blocks and a plurality of guide slots wherein the body of the second actuator comprises the plurality of guide blocks and the plurality of guide slots are formed on the plurality of wedges and each guide slot includes a guide block of the plurality of guide blocks disposed at least partially in the respective guide slot; and
    a lock ring disposed about the plurality of wedges, the lock ring comprising a set of one or more internal locking surfaces.

9. The locking assembly of claim 8, wherein the set of one or more external locking surfaces of each wedge of the plurality of wedges is engaged with one or more of a set of grooves formed in the lock ring or the internal locking surfaces of the lock ring in the locked position, and the set of one or more external locking surfaces of each wedge of the plurality of wedges is disengaged from one or more of the set of grooves formed in the lock ring or the internal locking surfaces of the lock ring in the unlocked position.

10. The locking assembly of claim 8, wherein each guide block of the plurality of guide blocks is coupled to the body of the second actuator using one or more fasteners, and the plurality of guide slots are formed in tapered inner surfaces of the plurality of wedges.

11. The locking assembly of claim 8, wherein the plurality of guide blocks comprise a circular portion and the plurality of guide slots comprise a circular portion.

12. The locking assembly of claim 11, wherein the plurality of guide blocks further comprise a rectangular portion and the plurality of guide slots further comprise a rectangular portion.

13. The locking assembly of claim 12, wherein the rectangular portion of the plurality of guide blocks is disposed inward of the circular portion of the plurality of guide blocks, and the rectangular portion of the plurality of guide slots is disposed inward of the circular portion of the plurality of guide slots.

14. The locking assembly of claim 13, wherein the circular portion of the plurality of guide blocks and the circular portion of the plurality of guide slots each comprise a first width, and the rectangular portion of the plurality of guide blocks and the rectangular portion of the plurality of guide slots each comprise a second width that is less than the first width.

15. The locking assembly of claim 8, wherein the plurality of guide blocks comprises a dovetail tail, and the plurality of guide slots comprises dovetail pins.

16. A locking assembly for fluid ends, comprising:
  a first actuator, the first actuator comprising one or more coupling surfaces;
  a second actuator disposed at least partially about the first actuator, the second actuator comprising:
    a body, the body comprising one or more tapered interfacing surfaces;
    one or more coupling surfaces disposed in coupling engagement with the one or more coupling surfaces of the first actuator; and
    a center axis extending in a longitudinal direction through the body, wherein the one or more tapered interfacing surfaces taper outward at an angle relative to the center axis;
  a plurality of wedges disposed about the second actuator and movable between an unlocked position and a locked position, each wedge of the plurality of wedges comprising:
    a set of one or more external locking surfaces;
    a set of one or more tapered interfacing surfaces, wherein the one or more tapered interfacing surfaces of each wedge is configured to engage with one of the one or more tapered interfacing surfaces of the second actuator;
  a lock ring disposed about the plurality of wedges, the lock ring comprising a set of one or more internal locking surfaces configured to engage with the external locking surfaces of each wedge of the plurality of wedges; and
  wherein the body of the second actuator comprises a plurality of guide blocks; and each wedge of the plurality of wedges comprises a guide slot formed in a respective tapered interfacing surface of the set of one or more tapered interfacing surfaces of the respective wedge, and each guide slot includes a guide block of the plurality of guide blocks disposed at least partially in the respective guide slot.

\* \* \* \* \*